United States Patent
Kishida et al.

(10) Patent No.: US 12,446,089 B2
(45) Date of Patent: Oct. 14, 2025

(54) BASE STATION AND TERMINAL APPARATUS

(71) Applicant: NTT, Inc., Tokyo (JP)

(72) Inventors: Akira Kishida, Musashino (JP); Kengo Nagata, Musashino (JP); Yasuhiko Inoue, Musashino (JP); Yusuke Asai, Musashino (JP); Yasushi Takatori, Musashino (JP)

(73) Assignee: NTT, Inc., Tokyo (JP)

( * ) Notice: Subject to any disclaimer, the term of this patent is extended or adjusted under 35 U.S.C. 154(b) by 368 days.

(21) Appl. No.: 18/017,932

(22) PCT Filed: Jul. 27, 2020

(86) PCT No.: PCT/JP2020/028673
§ 371 (c)(1),
(2) Date: Jan. 25, 2023

(87) PCT Pub. No.: WO2022/024172
PCT Pub. Date: Feb. 3, 2022

(65) Prior Publication Data
US 2023/0269804 A1   Aug. 24, 2023

(51) Int. Cl.
*H04W 76/15* (2018.01)
*H04W 52/02* (2009.01)

(52) U.S. Cl.
CPC ....... *H04W 76/15* (2018.02); *H04W 52/0261* (2013.01)

(58) Field of Classification Search
CPC .......................... H04W 76/15; H04W 52/0261
See application file for complete search history.

(56) References Cited

U.S. PATENT DOCUMENTS

| 2010/0040011 A1 | 2/2010 | Kang et al. |
| 2012/0170456 A1 | 7/2012 | Kang et al. |

(Continued)

FOREIGN PATENT DOCUMENTS

| JP | 2012-500551 A | 1/2012 |
| JP | 2017-63491 A | 3/2017 |
| JP | 2020074623 A | 5/2020 |

OTHER PUBLICATIONS

IEEE Std 802.11-2016, "Figure 4-25 Establishing the IEEE 802.11 association" and "11.3 STA authentication and association", Dec. 7, 2016.

(Continued)

*Primary Examiner* — Gbemileke J Onamuti
(74) *Attorney, Agent, or Firm* — Harness, Dickey & Pierce, P.L.C.

(57) ABSTRACT

A base station of the embodiment includes first and second wireless signal processing units and a link management unit. The first and second wireless signal processing units are configured to transmit and receive wireless signals using first and second channels, respectively. The link management unit establishes a multi-link with a terminal apparatus using the first and second wireless signal processing units, sets the first wireless signal processing unit as a primary link, and sets the second wireless signal processing unit to a secondary link. When the secondary link is in an active mode and a first condition is satisfied, the link management unit sets the secondary link to the operation pause mode. When the secondary link is in an operation pause mode and a second condition is satisfied, the link management unit sets the secondary link to the active mode.

10 Claims, 29 Drawing Sheets

(56) References Cited

U.S. PATENT DOCUMENTS

| | | |
|---|---|---|
| 2015/0029971 A1 | 1/2015 | Nishio et al. |
| 2015/0105121 A1 | 4/2015 | Emmanuel et al. |
| 2017/0048054 A1 | 2/2017 | Tsuda et al. |
| 2019/0335454 A1 | 10/2019 | Huang et al. |
| 2020/0120603 A1 | 4/2020 | Seok et al. |
| 2020/0163141 A1 | 5/2020 | Hsu et al. |

OTHER PUBLICATIONS

International Search Report of the ISA (English and Japanese) issued in PCT/JP2020/028673, mailed Dec. 15, 2020; ISA/JP.

Fig. 9

| STA FUNCTION | FREQUENCY BAND | LINK DISTRIBUTION ID | MULTI-LINK | TID |
|---|---|---|---|---|
| STA1 | 6GHz | XX | O (PRIMARY) | #1,#2 |
| STA2 | 5GHz | XX | O (SECONDARY) | #1,#3 |
| STA3 | 2.4GHz | - | - | - |

Fig. 27

| STA FUNCTION | FREQUENCY BAND | CHANNEL ID | LINK DISTRIBUTION ID | MULTI-LINK | TID |
|---|---|---|---|---|---|
| STA1 | 6GHz | CH1 | - | - | - |
| | | CH2 | XX | ○ | #1,#2 |
| | | CH3 | - | - | - |
| STA2 | 6GHz | CH1 | - | - | - |
| | | CH2 | - | - | - |
| | | CH3 | XX | ○ | #1,#3 |

Fig. 28

|  | PRIMARY LINK | SECONDARY LINK |
|---|---|---|
| FIRST EXAMPLE | PAST TRAFFIC | INCREASED TRAFFIC |
| SECOND EXAMPLE | DATA SIZE LARGE (E.G., TCP TRAFFIC) | DATA SIZE SMALL (E.G., ACK) |

BASE STATION AND TERMINAL APPARATUS

CROSS-REFERENCE TO RELATED APPLICATIONS

This application is a 371 U.S. National Phase of International Application No. PCT/JP2020/028673, filed on Jul. 27, 2020. The entire disclosure of the above application is incorporated herein by reference.

TECHNICAL FIELD

An embodiment relates to a base station and a terminal apparatus.

BACKGROUND ART

A wireless LAN (Local Area Network) is known as a wireless system for wirelessly connecting a base station and a terminal.

CITATION LIST

Non Patent Literature

NPL 1: IEEE Std 802.11-2016, "FIG. 4-25 Establishing the IEEE 802.11 association" and "11.3 STA authentication and association", 7 Dec. 2016

SUMMARY OF INVENTION

Technical Problem

An object is to suppress power consumption of a wireless terminal apparatus.

Means for Solution to Problem

A base station of an embodiment includes a first wireless signal processing unit, a second wireless signal processing unit, and a link management unit. The first wireless signal processing unit is configured to be able to transmit and receive a wireless signal using a first channel. The second wireless signal processing unit is configured to be able to transmit and receive a wireless signal using a second channel that is different from the first channel. The link management unit establishes a multi-link with a terminal apparatus using the first wireless signal processing unit and the second wireless signal processing unit, sets the first wireless signal processing unit as a primary link used as a main link in the multi-link, and sets the second wireless signal processing unit as a secondary link used as an auxiliary link in the multi-link. When the secondary link is in an active mode and a first condition is satisfied in the multi-link, the link management unit sets the secondary link to an operation pause mode in which power consumption is lower than that of the active mode. When the secondary link is in the operation pause mode and a second condition is satisfied in the multi-link, the link management unit sets the secondary link to the active mode.

Advantageous Effects of Invention

The base station of the embodiment can suppress power consumption with the multi-link.

BRIEF DESCRIPTION OF DRAWINGS

FIG. 9 is a table showing an example of link management information in the wireless system according to the embodiment.

FIG. 27 is a table showing an example of link management information in the wireless system according to the fifth modified example of the embodiment.

FIG. 28 is a table showing an example of data allocation in a multi-link of a wireless system according to the third modified example of the embodiment.

DESCRIPTION OF EMBODIMENTS

Figure 1:
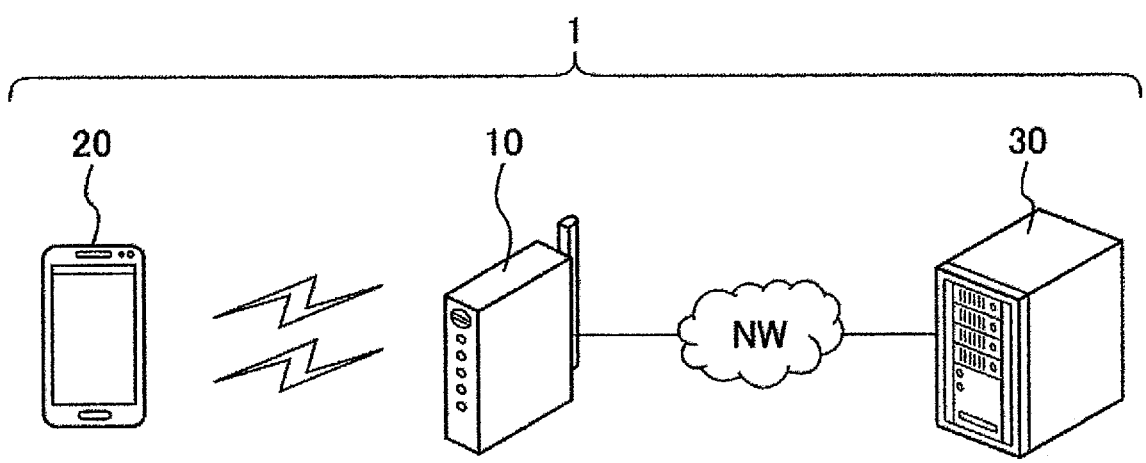
FIG. 1 is a conceptual diagram showing an example of an overall configuration of a wireless system according to an embodiment.

Hereinafter, embodiments will be described with reference to the drawings. Each embodiment illustrates an apparatus or method for embodying the technical idea of the invention. The drawings are schematic or conceptual. The dimensions and ratios of each drawing are not necessarily the same as the actual ones. The technical idea of the present invention is not specified by the shape, structure, arrangement, and the like of the constituent elements. In the following description, components having substantially the same function and configuration are denoted by the same reference numerals.

<1> CONFIGURATION OF WIRELESS SYSTEM 1

A wireless system 1 according to the embodiment relates to a method of enabling/disabling a link during the multi-link. A wireless system 1 according to an embodiment will be described hereinafter.

<1-1> Overall Configuration of Wireless System 1

FIG. 1 illustrates an example of a configuration of a wireless system 1 according to the embodiment. As shown in FIG. 1, the wireless system 1 includes, for example, a base station 10, a terminal apparatus 20, and a server 30.

The base station 10 is connected to a network NW and is used as an access point of a wireless LAN. For example, the base station 10 can wirelessly distribute data received from the network NW to the terminal apparatus 20. Also, the base station 10 can be connected to the terminal apparatus 20 using one type of band or a plurality of types of bands. In the present specification, a wireless connection between the base station 10 and the terminal apparatus 20 using a plurality of types of bands is referred to as a "multi-link". Communication between the base station 10 and the terminal apparatus 20 is based on, for example, the IEEE 802.11 standard.

The terminal apparatus 20 is, for example, a wireless terminal apparatus such as a smartphone or a tablet PC. The terminal apparatus 20 can transmit and receive data to and from a server 30 on the network NW via the base station 10, which is connected wirelessly. Note that the terminal apparatus 20 may be another electronic device such as a desktop computer or a laptop computer. The terminal apparatus 20 may be a device that can communicate with at least the base station 10 and can execute later-described operations.

The server 30 can hold various types of information, and for example, holds data of content for the terminal apparatus 20. The server 30 is connected to, for example, the network NW by wire, and is configured to be able to communicate with the base station 10 via the network NW.

Note that the server 30 may be able to communicate with at least the base station 10. That is, communication between the base station 10 and the server 30 may be by wire or wirelessly.

In the wireless system 1 according to the embodiment, the data communication between the base station 10 and the terminal apparatus 20 is based on an OSI (Open Systems Interconnection) reference model. Communication functions in the OSI reference model are divided into seven layers (Layer 1: physical layer, Layer 2: data link layer, Layer 3: network layer, Layer 4: transport layer, Layer 5: session layer, Layer 6: presentation layer, Layer 7: application layer).

The data link layer includes, for example, an LLC (Logical Link Control) layer and a MAC (Media Access Control) layer. The LLC layer also adds a DSAP (Destination Service Access Point) header and an SSAP (Source Service Access Point) header and so forth to data input from a higher application for example, thereby forming LLC packets. The MAC layer adds a MAC header to, for example, an LLC packet to form a MAC frame.

Figure 2:
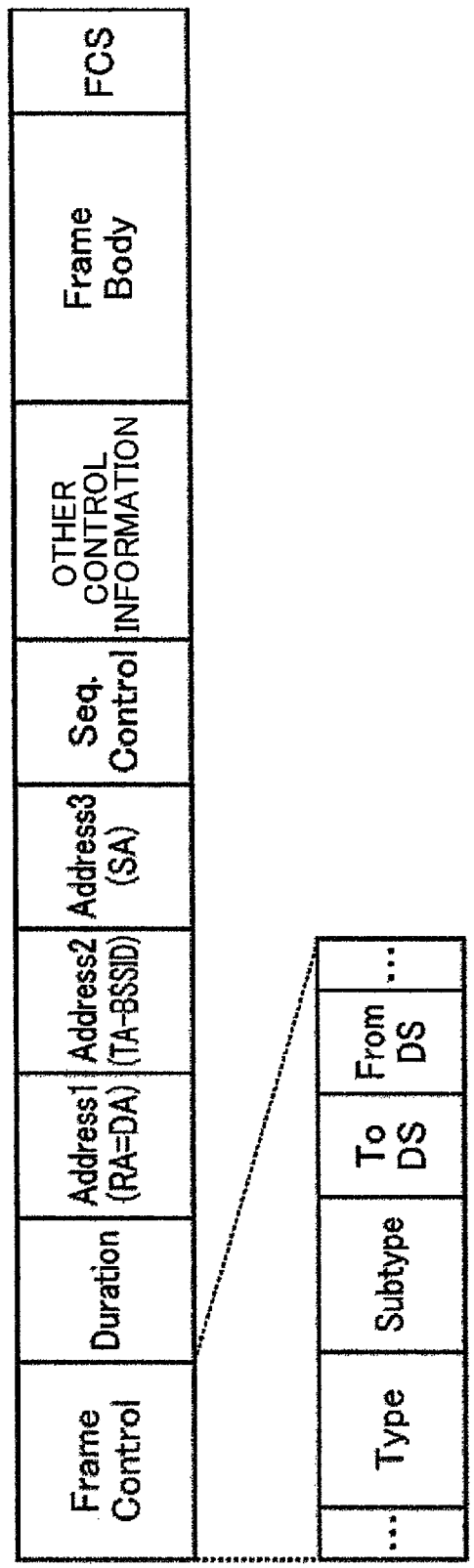
FIG. 2 is a conceptual diagram showing a specific example of a format of a wireless frame in the wireless system according to the embodiment.

FIG. 2 shows a specific example of the format of a wireless frame used in the communication between the base station 10 and the terminal apparatus 20 in the wireless system 1 according to the embodiment. As shown in FIG. 2, the wireless frame includes, for example, a Frame Control field, a Duration field, an Address1 field, an Address2 field, an Address3 field, a Sequence Control field, an other control information field, a Frame Body field, and an FCS (Frame Check Sequence) field.

The Frame Control field to the other control information field correspond to, for example, a MAC header included in a MAC frame. The Frame Body field corresponds to, for example, a MAC payload contained in the MAC frame. The FCS field stores an error detection code between the MAC header and the Frame Body field, and is used to determine the presence of an error in the wireless frame.

The Frame Control field indicates various types of control information and includes, for example, a Type value, a Subtype value, a To DS (To Distribution System) value, and a From DS value. The Type value indicates the frame type of the wireless frame. For example, the Type value "00" indicates that the wireless frame is a management frame. The Type value "01" indicates that the wireless frame is a control frame. The Type value "10" indicates that the wireless frame is a data frame.

The content of the wireless frame changes depending on the combination of the Type value and the Subtype value. For example, "00/1000 (Type value/Subtype value)" indicates that the wireless frame is a beacon signal. The meaning of the To DS value and From DS value differs depending on the combination. For example, "00 (To DS/From DS)" indicates that the data is between terminal apparatuses in the same IBSS (Independent Basic Service Set). "10" indicates that the data frame is directed to the DS (Distribution System) from the outside. "01" indicates that the data frame is to go out of the DS. "11" is used when forming a mesh network.

The Duration field indicates a scheduled period of using the wireless line. The plurality of Address fields indicate a BSSID, a source address, a destination address, a sender terminal apparatus address, a receiver terminal apparatus address, and the like. The Sequence Control field shows the sequence number of the MAC frame and the fragment number for the fragment. Other control information fields include, for example, traffic type (TID) information. The TID information may be inserted at other locations within the wireless frame. The Frame Body field includes information corresponding to the type of the frame. For example, the Frame Body field stores data when it corresponds to a data frame.

<1-2> Configuration of Base Station 10

Figure 3:
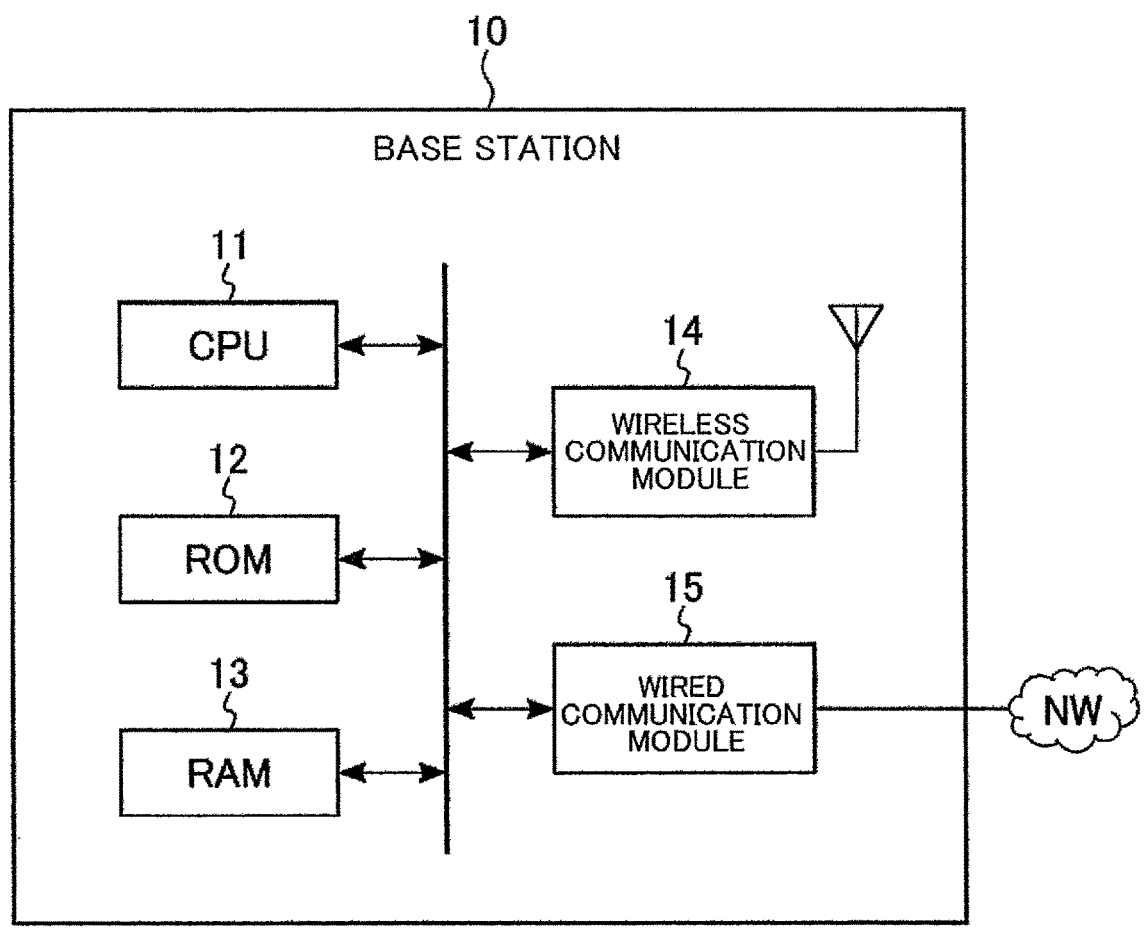
FIG. 3 is a block diagram showing an example of a configuration of a base station included in the wireless system according to the embodiment.

FIG. 3 shows an example of a configuration of the base station 10 included in the wireless system 1 according to the embodiment. As shown in FIG. 3, the base station 10 includes, for example, a CPU (Central Processing Unit) 11, a ROM (Read Only Memory) 12, a RAM (Random Access Memory) 13, a wireless communication module 14, and a wired communication module 15.

The CPU 11 is a circuit that can execute various programs, and controls the overall operation of the base station 10. The ROM 12 is a non-volatile semiconductor memory, and holds a program, control data, and the like for controlling the base station 10. The RAM 13 is, for example, a volatile semiconductor memory and is used as a work region of the CPU 11. The wireless communication module 14 is a circuit used for transmitting and receiving data by a wireless signal, and is connected to an antenna. Also, the wireless communication module 14 includes, for example, a plurality of communication modules that respectively correspond to a plurality of frequency bands. The wired communication module 15 is a circuit used for transmitting and receiving data by a wired signal, and is connected to the network NW.

Figure 4:
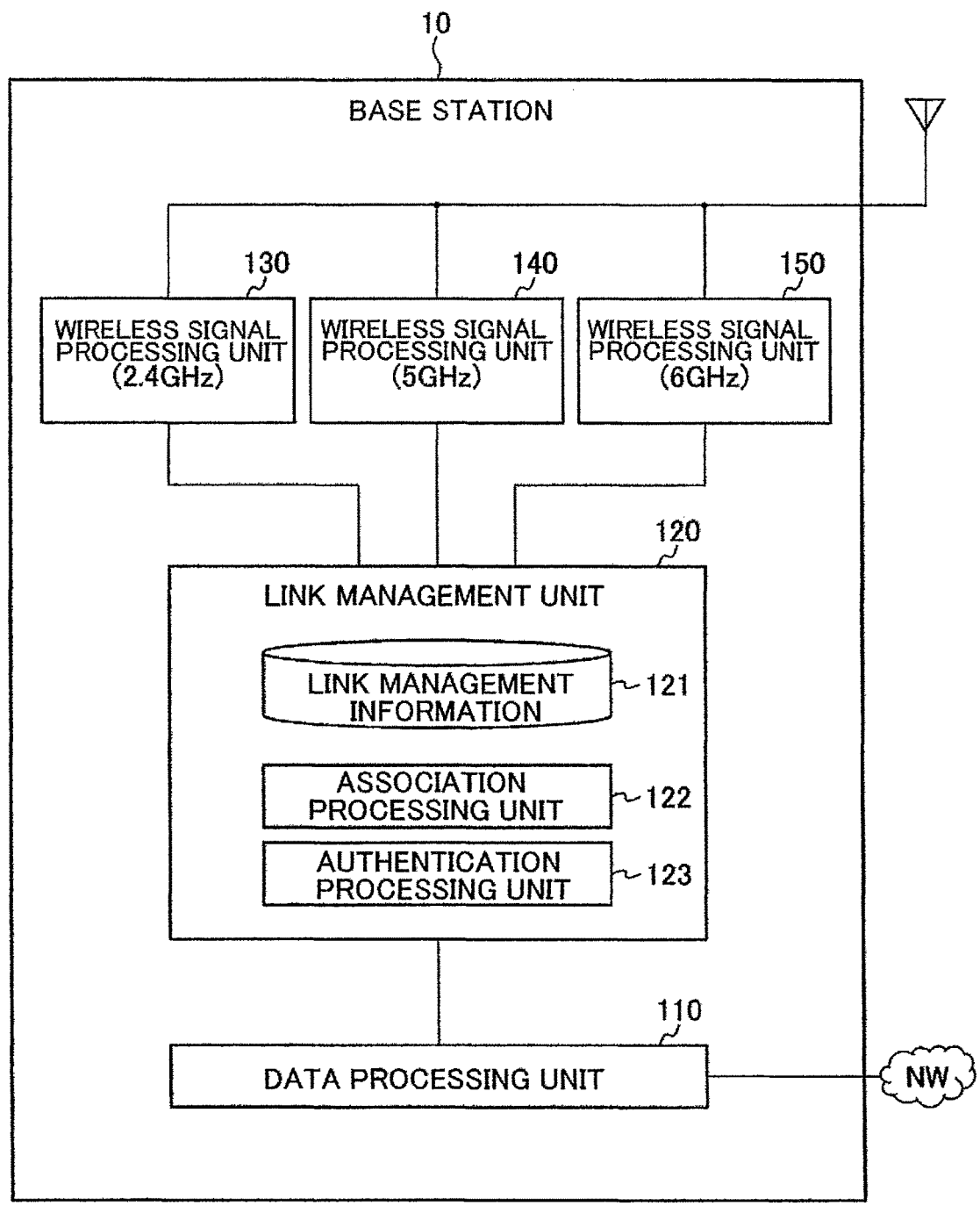
FIG. 4 is a block diagram showing an example of functions of a base station included in a wireless system according to the embodiment.

FIG. 4 shows an example of a functional configuration of the base station 10 included in the wireless system 1 according to the embodiment. As shown in FIG. 4, the base station 10 includes, for example, a data processing unit 110, a link management unit 120, and wireless signal processing units 130, 140, and 150. The processing of the data processing unit 110, the link management unit 120, and the wireless signal processing units 130, 140, and 150 is realized by, for example, the CPU 11 and the wireless communication module 14.

The data processing unit 110 may execute the processing of the LLC layer and the processing of the upper layer (third layer to seventh layer) on the input data. For example, the data processing unit 110 outputs the data input from the server 30 via the network NW to the link management unit 120. Also, the data processing unit 110 transmits the data input from the link management unit 120 to the server via the network NW.

The link management unit 120 executes, for example, some of the processing of the MAC layer on the input data. Also, the link management unit 120 manages the link with the terminal apparatus 20 based on notifications from the wireless signal processing units 130, 140, and 150. The link management unit 120 includes link management information 121. The link management information 121 is stored in, for example, the RAM 13, and includes information on the terminal apparatus 20 that is wirelessly connected to the base station 10. Also, the link management unit 120 includes an association processing unit 122 and an authentication processing unit 123. When the association processing unit 122 receives a connection request of the terminal apparatus 20 via one of the wireless signal processing units 130, 140, and 150, the association processing unit 122 executes a protocol related to the association. The authentication processing unit 123 executes a protocol related to authentication following the connection request.

Each of the wireless signal processing units 130, 140, and 150 performs transmission and reception of data between the base station 10 and the terminal apparatus 20 using wireless communication. For example, each of the wireless signal processing units 130, 140, and 150 creates a wireless frame by adding a preamble, a PHY header, or the like to the data input from the link management unit 120. Then, each of the wireless signal processing units 130, 140, and 150 converts the wireless frame into a wireless signal and distributes the wireless signal via the antenna of the base station 10. Further, each of the wireless signal processing units 130, 140, and 150 converts the wireless signal received via the antenna of the base station 10 into a wireless frame. Then, each of the wireless signal processing units 130, 140, and 150 outputs the data contained in the wireless frame to the link management unit 120.

Each of the wireless signal processing units 130, 140, and 150 can execute, for example, part of the processing of the MAC layer and the processing of the first layer on the input data or the wireless signal. For example, the wireless signal processing unit 130 handles wireless signals in the 2.4 GHz band. The wireless signal processing unit 140 handles wireless signals in the 5 GHz band. The wireless signal processing unit 150 handles wireless signals in the 6 GHz band. The wireless signal processing units 130, 140, and 150 may or may not share the antenna of the base station 10.

<1-3> Configuration of Terminal Apparatus 20

Figure 5:
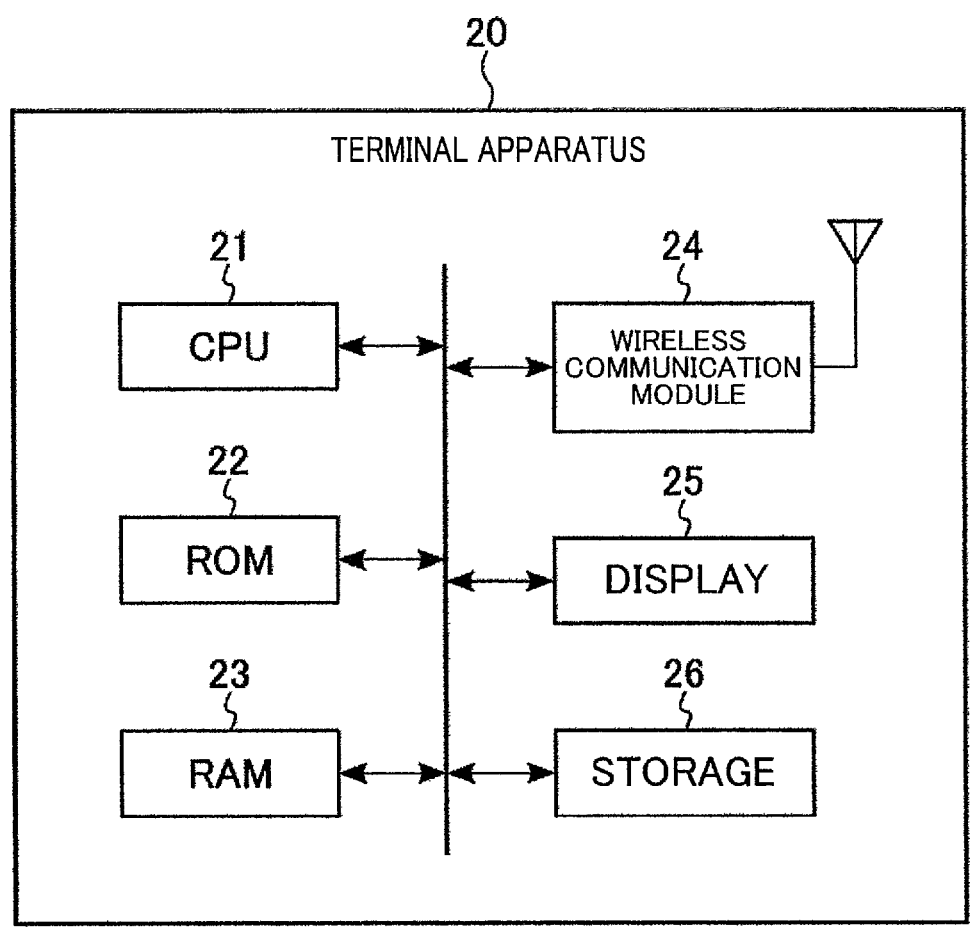
FIG. 5 is a block diagram showing an example of a configuration of a terminal apparatus included in the wireless system according to the embodiment.

FIG. 5 shows an example of a configuration of the terminal apparatus 20 included in the wireless system 1 according to the embodiment. As shown in FIG. 5, the terminal apparatus 20 includes, for example, a CPU 21, a ROM 22, a RAM 23, a wireless communication module 24, a display 25, and a storage 26.

The CPU 21 is a circuit that can execute various programs, and controls the overall operation of the terminal apparatus 20. The ROM 22 is a non-volatile semiconductor memory, and holds a program, control data, and the like for controlling the terminal apparatus 20. The RAM 23 is, for example, a volatile semiconductor memory and is used as a work region of the CPU 21. The wireless communication module 24 is a circuit used for transmitting and receiving data by a wireless signal, and is connected to an antenna. Also, the wireless communication module 24 includes, for example, a plurality of communication modules that respectively correspond to a plurality of frequency bands. The display 25 displays, for example, a GUI (Graphical User Interface) corresponding to application software. The display 25 may include a function of an input interface of the terminal apparatus 20. The storage 26 is a non-volatile storage device, and holds, for example, system software and the like of the terminal apparatus 20. The terminal apparatus 20 may not have a display. For example, in an IoT terminal apparatus, the display 25 may be omitted.

Figure 6:
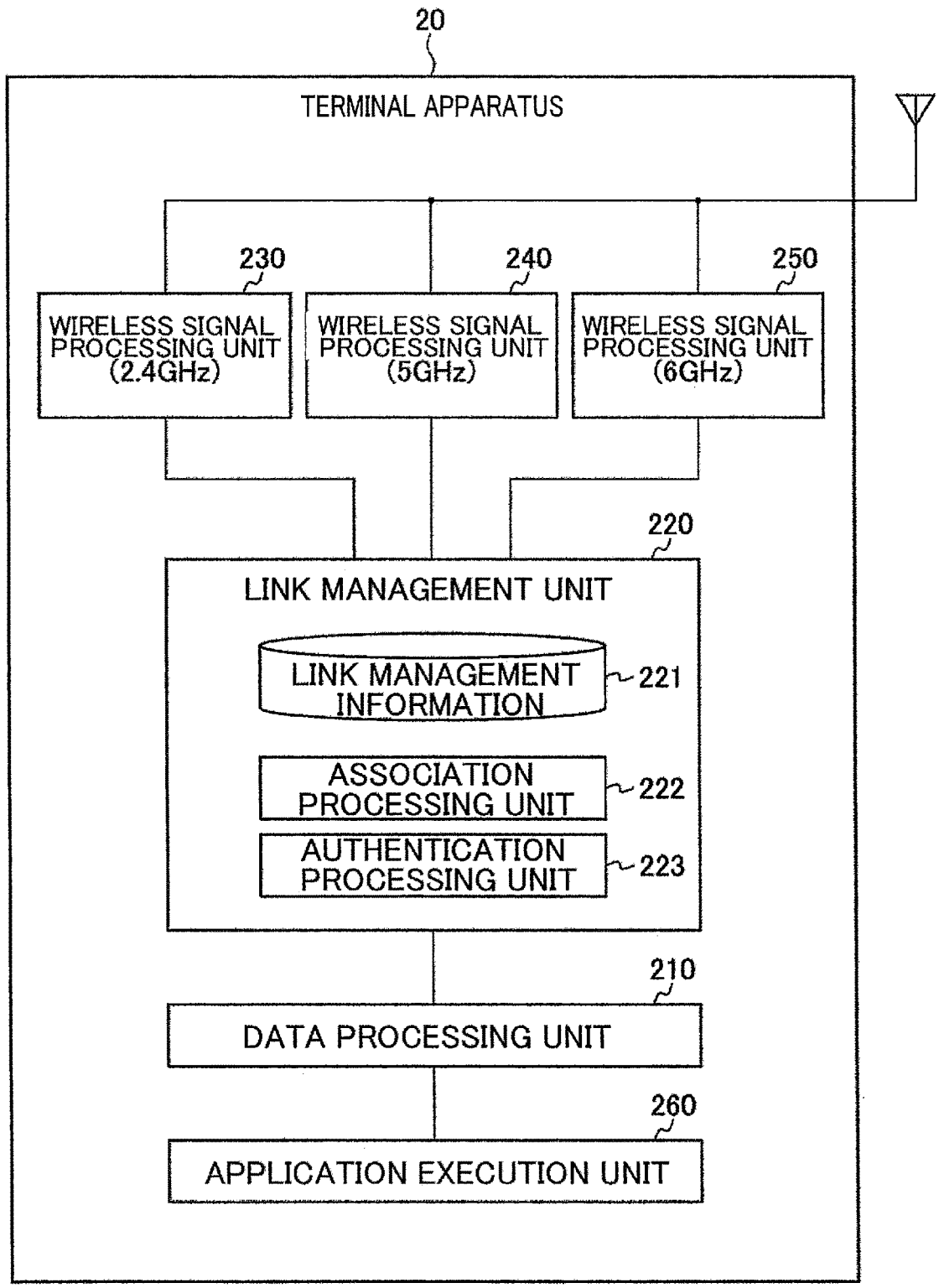
FIG. 6 is a block diagram showing an example of functions of the terminal apparatus included in the wireless system according to the embodiment.

FIG. 6 shows an example of a functional configuration of the terminal apparatus 20 included in the wireless system 1 according to the embodiment. As shown in FIG. 6, the terminal apparatus 20 includes, for example, a data processing unit 210, a link management unit 220, wireless signal processing units 230, 240, and 250, and an application execution unit 260. The processing of the data processing unit 210, the link management unit 220, and the wireless signal processing units 230, 240, and 250 is realized by, for example, the CPU 21 and the wireless communication module 24.

The data processing unit 210 may execute the processing of the LLC layer and the processing of the upper layer (third layer to seventh layer) on the input data. For example, the data processing unit 210 outputs the data input from the application execution unit 260 to the link management unit 220. Also, the data processing unit 210 outputs the data input from the link management unit 220 to the application execution unit 260.

The link management unit 220 executes, for example, some of the processing of the MAC layer on the input data. Also, the link management unit 220 manages the link with the base station 10 based on notifications from the wireless signal processing units 230, 240, and 250. The link management unit 220 includes link management information 221. The link management information 221 is stored, for example, in the RAM 23 and contains information on a base station 10 wirelessly connected to the terminal apparatus 20. Also, the link management unit 220 includes an association processing unit 222 and an authentication processing unit 223. When the association processing unit 222 receives the connection of the base station 10 via one of the wireless signal processing units 230, 240, and 250, the association processing unit 222 executes a protocol related to association. The authentication processing unit 223 executes a protocol related to authentication following the connection.

Each of the wireless signal processing units 230, 240, and 250 performs transmission and reception of data between the base station 10 and the terminal apparatus 20 using wireless communication. For example, each of the wireless signal processing units 230, 240, and 250 creates a wireless frame by adding a preamble, a PHY header, or the like to the data input from the link management unit 220. Then, each of the wireless signal processing units 230, 240, and 250 converts the wireless frame into a wireless signal and distributes the wireless signal via the antenna of the terminal apparatus 20. Further, each of the wireless signal processing units 230, 240, and 250 converts the wireless signal received via the antenna of the terminal apparatus 20 into a wireless frame. Then, each of the wireless signal processing units 230, 240, and 250 outputs the data contained in the wireless frame to the link management unit 220.

Each of the wireless signal processing units 230, 240, and 250 can execute, for example, some of the processing of the MAC layer and the processing of the first layer on the input data or the wireless signal. For example, the wireless signal processing unit 230 handles wireless signals in the 2.4 GHz band. The wireless signal processing unit 240 handles wireless signals in the 5 GHz band. The wireless signal processing unit 250 handles wireless signals in the 6 GHz band. The wireless signal processing units 230, 240, and 250 may or may not share the antenna of the terminal apparatus 20.

The application execution unit 260 executes an application that can use the data input from the data processing unit 210. For example, the application execution unit 260 can display information on the application on the display 25. Also, the application execution unit 260 can operate based on operation of the input interface.

In the wireless system 1 according to the embodiment described above, the wireless signal processing units 130, 140, and 150 of the base station 10 are configured to be able to connect to the wireless signal processing units 230, 240, and 250 of the terminal apparatus 20, respectively. That is, the wireless signal processing units 130 and 230 can be wirelessly connected using the 2.4 GHz band. The wireless signal processing units 140 and 240 can be wirelessly connected using the 5 GHz band. The wireless signal processing units 150 and 250 can be wirelessly connected using the 6 GHz band. In the present specification, each wireless signal processing unit may be referred to as a "STA function". That is, the wireless system 1 according to the embodiment includes a plurality of STA functions.

<1-4> Link Management Unit

Figure 7:
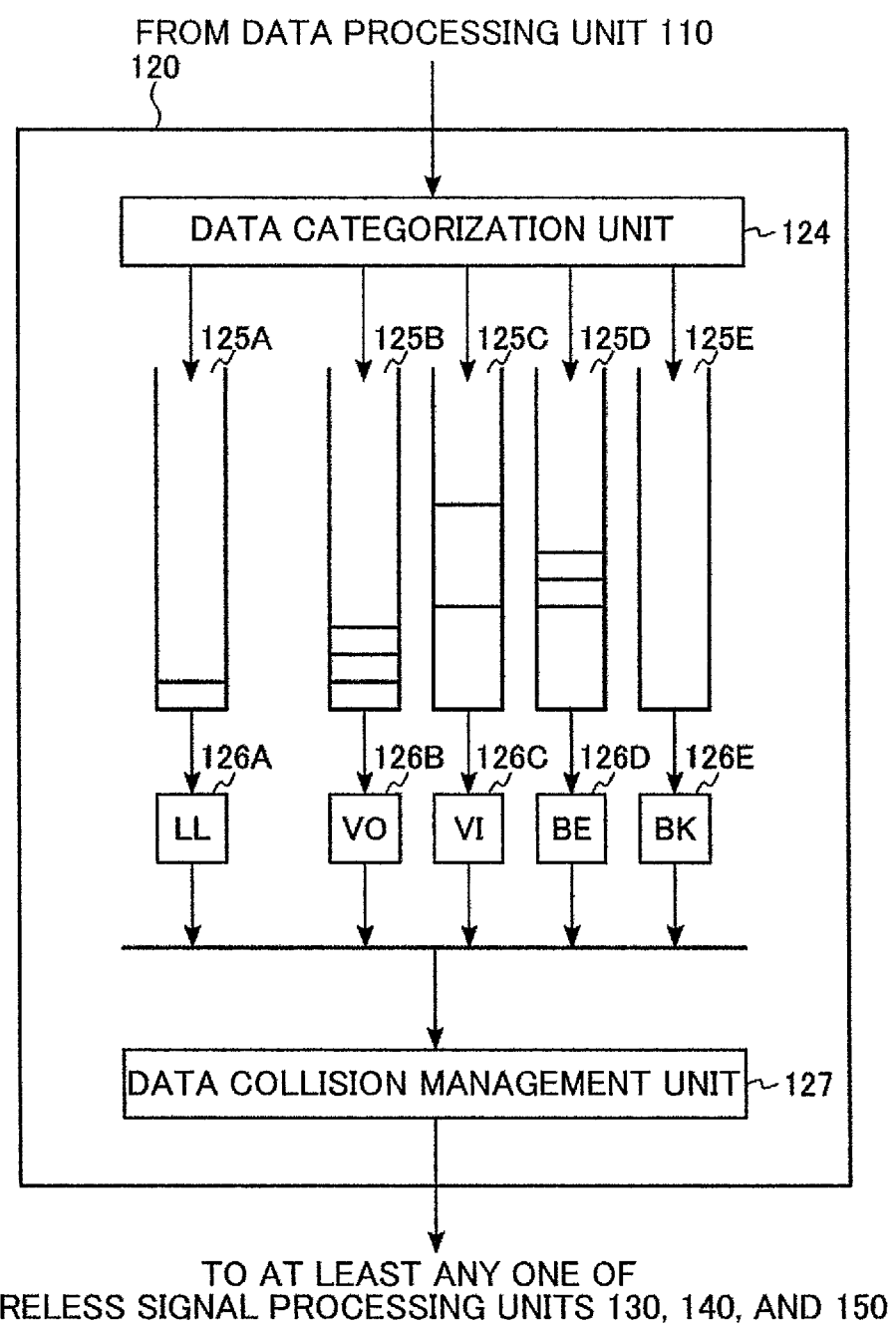
FIG. 7 is a block diagram showing an example of a detailed function of a link management unit of a base station included in the wireless system according to the embodiment.

FIG. 7 shows the details of the channel access function in the link management unit 120 of the base station 10 included in the wireless system 1 according to the embodiment. Since the function of the link management unit 220 of the terminal apparatus 20 is the same as that of the link management unit 120 of the base station 10, for example, the description thereof will be omitted. As shown in FIG. 7, the link management unit 120 includes, for example, a data categorization unit 124, transmission queues 125A, 125B, 125C, 125D and 125E, CSMA/CA (Carrier Sense Multiple Access with Collision Avoidance) execution units 126A, 126B, 126C, 126D, and 126E, and a data collision management unit 127.

The data categorization unit 124 categorizes the data input from the data processing unit 110. As the data category, for example, "LL (Low Latency)", "VO (Voice)", "VI (Video)", "BE (Best Effort)", and "BK (Background)" are set. LL is applied to data that requires low latency. Therefore, it is preferable that the LL data is processed in preference to any of the VO, VI, BE and BK data.

Then, the data categorization unit 124 inputs the categorized data to any of the transmission queues 125A, 125B, 125C, 125D, and 125E. Specifically, the LL data is input to the transmission queue 125A. The VO data is input to the transmission queue 125B. The VI data is input to the transmission queue 125C. The BE data is input to the transmission queue 125D. The BK data is input to the transmission queue 125E. Then, the input data of each category is accumulated in any of the corresponding transmission queues 125A to 125E.

Each of the CSMA/CA execution units 126A, 126B, 126C, 126D and 126E waits for transmission for the time specified by preset access parameters while checking by the carrier sense in the CSMA/CA that there is no wireless signals transmitted from other terminal apparatuses or the like. Then, the CSMA/CA execution units 126A, 126B, 126C, 126D and 126E extract data from the transmission queues 125A, 125B, 125C, 125D and 125E, respectively, and output the extracted data to at least one of the wireless signal processing units 130, 140 and 150 via the data collision management unit 127. Then, the wireless signal including the data is transmitted by the wireless signal processing unit (STA function) whose transmission right has been acquired by CSMA/CA.

The CSMA/CA execution unit 126A executes CSMA/CA for the LL data held in the transmission queue 125A. The CSMA/CA execution unit 126B executes CSMA/CA for the VO data held in the transmission queue 125B. The CSMA/CA execution unit 126C executes CSMA/CA for the VI data held in the transmission queue 125C. The CSMA/CA execution unit 126D executes CSMA/CA for the BE data held in the transmission queue 125D. The CSMA/CA execution unit 126E executes CSMA/CA for the BK data held in the transmission queue 125E.

The access parameters are allocated so that the transmission of wireless signals is prioritized in the order of, for example, LL, VO, VI, BE, and BK. Access parameters include, for example, CWmin, CWmax, AIFS, TXOPLimit. CWmin and CWmax indicate the minimum value and the maximum value of the contention window CW (Contention Window), which is the transmission waiting time for collision avoidance, respectively. AIFS (Arbitration Inter Frame Space) indicates a fixed transmission waiting time set for each access category for collision avoidance control having a priority control function. TXOPLimit indicates an upper limit value of TXOP (Transmission Opportunity) corresponding to the occupation time of the channel. For example, in the transmission queue 125, the shorter the CWmin and CWmax, the easier it is to obtain the transmission right. The priority of the transmission queue 125 becomes higher as the AIFS is smaller. The amount of data transmitted with one transmission right increases as the value of TXOP Limit increases.

The data collision management unit 127 prevents data collisions when a plurality of CSMA/CA execution units 126 acquire transmission rights with the same STA function. Specifically, the data collision management unit 127 adjusts the transmission timings of pieces of data with different categories in which the transmission right is acquired by the same STA function, and transmits the data to the STA function, starting from the data of the category with the higher priority. For example, the STA function that has acquired the transmission right by the CSMA/CA of the LL transmission queue 125A may be the same as the STA function that has acquired the transmission right by the CSMA/CA of any of the other transmission queues 125B to 125E. In this case, the data collision management unit 127 preferentially transmits the data stored in the transmission queue 125A to the STA function. Similarly, in the other combinations of the transmission queues 125, the data is transmitted in the order based on the priority set in the category. This prevents collisions between pieces of data of which the transmission is allocated to the same STA function.

In the present embodiment, the form in which the link management unit implements the channel access function is described, but each STA function may implement the channel access function. When the link management unit implements the channel access function, each STA function detects the state (idle/busy) of the wireless channel in the corresponding link, and the link management unit determines whether data can be transmitted (for example, which link will be used for transmitting the data). On the other hand, when each STA function implements the channel access function, each STA function may independently execute carrier sense and transmit data. At this time, the channel access when a plurality of links are used at the same time may be executed by a plurality of STA functions exchanging and sharing the access parameters, and may be executed by the link management unit sharing the access parameters. The base station 10 and the terminal apparatus 20 can use a plurality of links at the same time by transmitting data among the plurality of STA functions based on common access parameters.

<2> OPERATION OF WIRELESS SYSTEM 1

Hereinafter, examples of various operations related to the multi-link of the wireless system 1 according to the embodiment will be described. In the following description, for the sake of simplicity, STA1 and STA2 of the base station 10 are also referred to as "access point AP". The transmission of wireless signals from the STA1 and STA2 of the terminal apparatus 20 to the access point AP corresponds to the transmission of wireless signals to the STA1 and STA2 of the base station 10, respectively. When STA1 and STA2 are described independently, they indicate the STA function of the terminal apparatus 20.

<2-1> Multi-Link Processing

Figure 8:
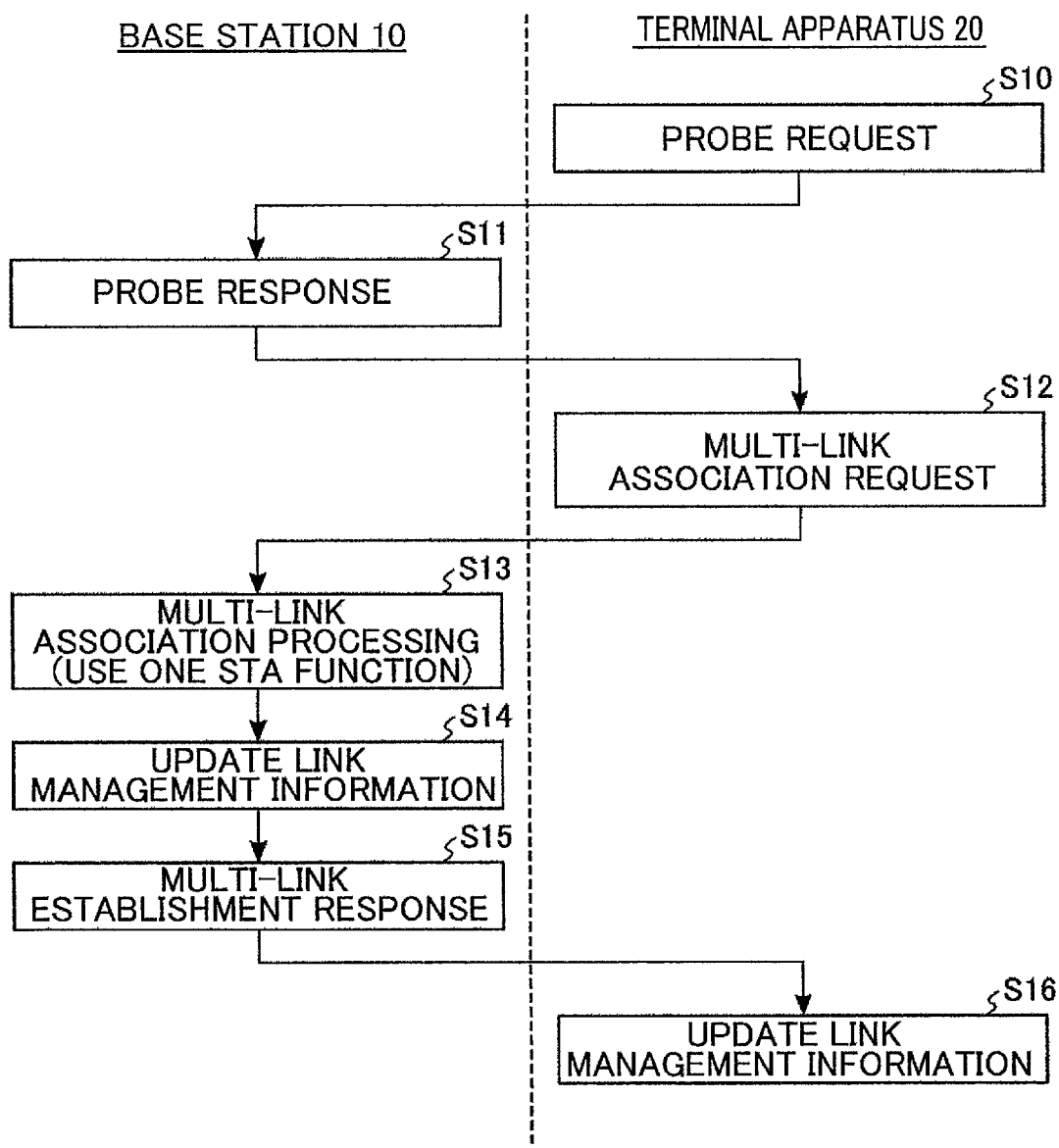
FIG. 8 is a flowchart showing an example of multi-link processing in the wireless system according to the embodiment.

FIG. 8 is a flowchart showing an example of multi-link processing in the wireless system 1 according to the embodiment. As shown in FIG. 8, in the multi-link processing, for example, the processing of steps S10 to S16 is executed sequentially.

Specifically, first, in the processing of step S10, the terminal apparatus 20 transmits a probe request to the base station 10. The probe request is a signal for confirming whether or not the base station 10 is present in the surrounding area of the terminal apparatus 20. The Frame Control field of the probe request includes, for example, "00/0100 (Type value/Subtype value)". Upon receiving the probe request, the base station 10 executes the processing of step S11.

In the processing of step S11, the base station 10 transmits a probe response to the terminal apparatus 20. The probe response is a signal used by the base station 10 to respond to a probe request from the terminal apparatus 20. The Frame Control field of the probe response includes, for example, "00/0101 (Type value/Subtype value)". Upon receiving the probe, the terminal apparatus 20 executes the processing of step S12.

In the processing of step S12, the terminal apparatus 20 transmits a multi-link association request to the base station 10 via at least one STA function. The multi-link association request is a signal for requesting the base station 10 to establish a multi-link. For example, the multi-link association request is generated by the link management unit 220 of the terminal apparatus 20. The Frame Control field of the multi-link association request includes, for example, "00/xxxx (Type value/Subtype value (xxxx is a predetermined numeric value))". Upon receiving the multi-link association request, the link management unit 120 of the base station 10 executes the processing of step S13.

In the processing of step S13, the link management unit 120 of the base station 10 executes the multi-link association processing using one STA function. Specifically, first, the base station 10 executes the association processing of the first STA function with the terminal apparatus 20. Then, when the wireless connection (link) is established in the first STA function, the link management unit 120 of the base station 10 uses the first STA function for which the link is established to execute association processing of a second STA function. That is, the STA function for which the link is established is used for association processing of an STA function with no established link. When the association processing of at least two STA functions is completed, the base station 10 establishes the multi-link and executes the processing of step S14.

The multi-link may be established when the link is established in the first STA function. For example, each of the base station 10 and the terminal apparatus 20 can execute association of the multi-link in a batch by notifying of capability of the multi-link, the link to be multi-linked, and the operation parameter in each link prior to the association processing. Specifically, the link management units 120 and 220 instruct the establishment of the multi-link when the first STA function starts the association, and specify the link or the like to be multi-linked. Then, the link management units 120 and 220 execute the association of each link and manage these links as a multi-link.

In the processing of step S14, the link management unit 120 of the base station 10 updates the link management information 121. Note that in this example, the processing of step S14 is executed after two links are established, but the link management information 121 may be updated each time the link state is updated, or may be updated when the multi-link is established. When the multi-link is established and the link management information is updated, the base station 10 executes the processing of step S15.

In the processing of step S15, the base station 10 transmits a multi-link establishment response to the terminal apparatus 20. The multi-link establishment response is a signal used by the base station 10 to respond to a multi-link request from the terminal apparatus 20.

The Frame Control field of the multi-link association request includes, for example, "00/0001 (Type value/Sub-type value)". The link management unit 220 of the terminal apparatus 20 recognizes that the multi-link with the base station 10 has been established based on the fact that the multi-link establishment response was received. Upon receiving the multi-link establishment response, the terminal apparatus 20 executes the processing of step S16.

In the processing of step S16, the link management unit 220 of the terminal apparatus 20 updates the link management information 221. That is, the terminal apparatus 20 records the fact that the multi-link with the base station has been established in the link management information 221. As a result, the multi-link processing in the wireless system 1 according to the embodiment is complete, and data communication using the multi-link becomes possible between the base station 10 and the terminal apparatus 20.

FIG. 9 shows an example of the link management information 121 in the wireless system 1 according to the embodiment. Since the link management information 221 of the terminal apparatus 20 has information similar to the link management information 121 of the base station 10, the description thereof will be omitted. As shown in FIG. 9, the link management information 121 includes, for example, information on a STA function, a frequency band, a link destination ID, a presence of a multi-link, and a TID.

In this example, "STAT" corresponds to the STA function using the 6 GHz frequency band, that is, the wireless signal processing unit 150 or 250. "STA2" corresponds to the STA function using the 5 GHz frequency band, that is, the wireless signal processing unit 140 or 240. "STA3" corresponds to the STA function that uses the 2.4 GHz frequency band, that is, corresponds to the wireless signal processing unit 130 or 230.

The link destination ID corresponds to the identifier of the terminal apparatus 20 in the link management information 121, and corresponds to the identifier of the base station 10 in the link management information 221. In this example, a multi-link using STA1 and STA2 has been established. When the multi-link is established, each of the link management units 120 and 220 transmits the data input from the upper layer using the link of at least one STA function associated with the multi-link. Further, STA1 is set as the primary link and STA2 is set as the secondary link.

The primary link is the link used as the main link in the multi-link. A secondary link is a link that is used as an auxiliary link in a multi-link. The links that make up the multi-link are allocated to either the primary link or the secondary link. There may be two or more primary links and secondary links. For each terminal apparatus 20 that establishes a multi-link with the base station 10, the link sets constituting each multi-link may be different from each other, and the primary links may also be different from each other. By allowing different primary links, the optimum link between the base station 10 and each terminal apparatus 20 can be set as the primary link. This is expected to have the effect of improving the quality of wireless communication.

In addition to transmitting and receiving allocated data, the primary link is used for transmitting and receiving control information related to the operation of the multi-link. The primary link is preset, for example, when establishing a multi-link between the base station 10 and the terminal apparatus 20. The priority of the STA function used as the primary link may be set according to the frequency band or may be set according to the radio strength of the link.

"TID" in the link management information 121 indicates the association between the STA function and the TID information. Each STA function transmits and receives data corresponding to the allocated TID information. For example, each of TID #1 to TID #3 corresponds to any one of LL, VO, VI, BE, and BK. One STA function or a plurality of STA functions may be associated with one traffic, that is, one piece of TID information. In this example, TID #1 is allocated to both STA1 and STA2. TID #2 is allocated to STA1. TID #3 is allocated to STA2.

The traffic flow corresponding to the association between the traffic and the STA function is preset during setup of the multi-link between the base station 10 and the terminal apparatus 20. For example, the link management unit 220 of the terminal apparatus 20 determines the association between the traffic and the STA function, and sends a request to the link management unit 120 of the base station 10. Then, the base station 10 confirms the association between the traffic and the STA function by responding to the request.

The traffic is set to be even among a plurality of links constituting the multi-link, for example. Without being limited to this, similar types of traffic (priority/non-priority or the like) may be collected in one of the links constituting the multi-link. As for the association between the STA function and the traffic, for example, voice is associated with a 2.4 GHz frequency band and the video is associated with 5 G. In this way, it is preferable that the frequency used for transmission/reception is allocated according to the type of information to be handled and the amount of data.

<2-2> Data Transmission During the Multi-Link

Figure 10:
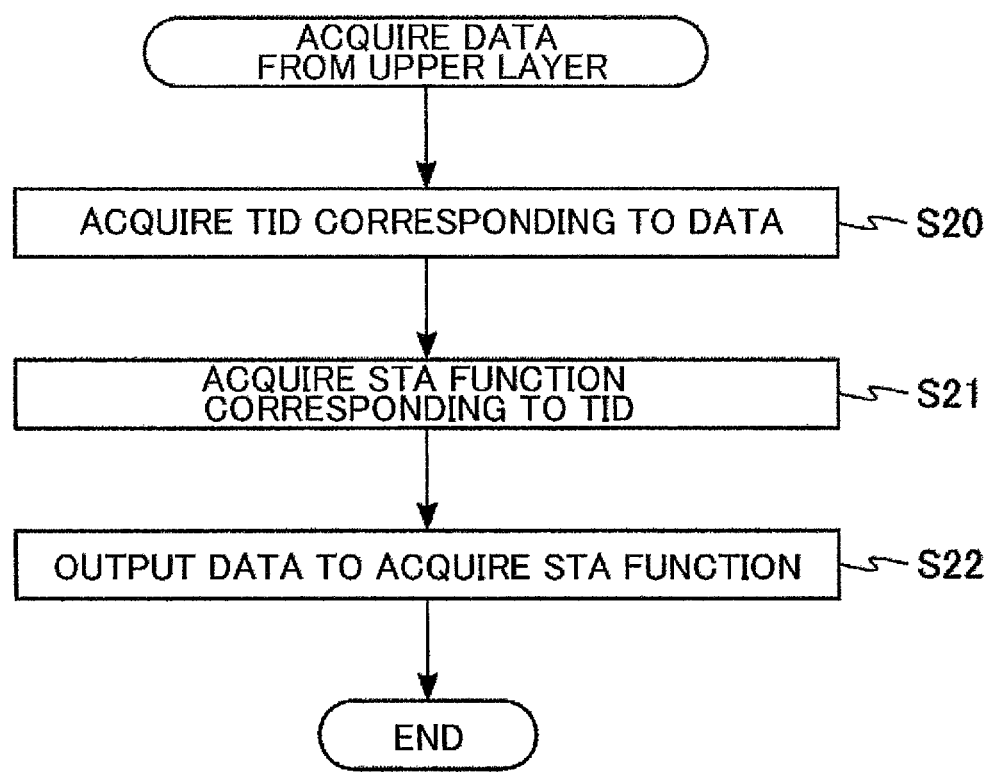
FIG. 10 is a flowchart showing an example of a data transmission method during the multi-link in the wireless system according to the embodiment.

FIG. 10 shows an example of a method of transmitting data during the multi-link in the base station 10 included in the wireless system 1 according to the embodiment. As shown in FIG. 10, when the base station 10 acquires data from the upper layer, the base station 10 sequentially executes the processes of steps S20 to S22.

Specifically, first, in the process of step S20, the link management unit 120 acquires the TID information corresponding to the data. In other words, the link management unit 120 associates the data with the TID based on the information contained in the header of the data acquired from the upper layer, for example. As a result, the link management unit 120 checks which TID the traffic flow of the data corresponds to.

Next, in the process of step S21, the link management unit 120 acquires the STA function corresponding to the associated TID information. At this time, the link management unit 120 checks the association between the TID information and the STA function by referring to the link management information 121. In the process of step S21, the number of STA functions acquired by the link management unit 120 may be one or plural.

Next, in the process of step S22, the link management unit 120 outputs data to the acquired STA function. When one STA function is associated with the output data (traffic), the data is transmitted in series using one STA function. On the other hand, when a plurality of STA functions are associated with the traffic, the data is transmitted in parallel using the plurality of STA functions.

When one traffic is transmitted in parallel, data sorting and rearrangement are executed between the link management unit 120 of the base station 10 and the link management unit 220 of the terminal apparatus 20. The data sorting is executed by the link management unit on the transmitting side, and the rearrangement of the data is executed by the link management unit on the receiving side. For example, the link management unit on the transmitting side adds a flag indicating that it is a multi-link and an identification number to the wireless frame. The link management unit on the receiving side executes data rearrangement based on the added flag and the identification number.

In the wireless system 1 according to the embodiment, when a plurality of pieces of data are received from the upper layer, the link management unit may execute aggregation by combining the received plurality of pieces of data. Aggregation in multi-link may be used as an optional function whose execution can be selected by the user.

<2-3> Multi-Link Power Save

In the wireless system 1 according to the embodiment, a plurality of types of operation modes are prepared for each STA function. Examples of the operation mode of the STA function include an active mode, an intermittent operation mode, and an operation pause mode. The active mode corresponds to a state in which the STA function of the terminal apparatus 20 maintains the Awake state so that wireless signals can be transmitted and received at any time. The intermittent operation mode corresponds to a state in which the STA function of the terminal apparatus repeats the Awake state and the Doze state to operate intermittently. The operation pause mode corresponds to a state in which the STA function of the terminal apparatus maintains the Doze state so that wireless signals cannot be transmitted and received. The plurality of STA functions constituting the multi-link include the link of at least one active mode and intermittent operation mode. The other links constituting the multi-link may be set to either active mode, intermittent operation mode, or operation pause mode.

The Awake state corresponds to a state in which wireless signals can be transmitted and received. The Doze state corresponds to a state in which wireless signals cannot be transmitted or received. In the Doze state, the supply of power to the circuit related to the STA function is appropriately cut off. Therefore, the power consumption of the STA function decreases in the order of active mode, intermittent operation mode, and operation pause mode. There may be a link that can be used for communication of the base station 10 or the terminal apparatus 20 but is not included in the link set of the multi-link between the base station and the terminal apparatus (Disabled link). In the following, for the sake of simplicity, a link in active mode or intermittent operation mode, that is, a link in which communication is possible is referred to as a "STA function (link) in Awake state". The link in the operation pause mode, that is, the link in the power saving state in which communication is impossible, is referred to as a "STA function (link) in Doze state".

In the multi-link in the wireless system 1 according to the embodiment, the STA function set in the primary link is set to, for example, either an active mode or an intermittent operation mode. On the other hand, the STA function set in the secondary link may be set to any of the active mode, the intermittent operation mode, and the operation pause mode. For example, the terminal apparatus 20 can operate in a power saving manner by setting the secondary link to the operation pause mode during the multi-link. In the following, the state of the multi-link in which the secondary link is set to the operation pause mode is referred to as "multi-link power save". When the multi-link is established by the multi-link process, the initial state of the secondary link may be set to any of the active mode, the intermittent operation mode, and the operation pause mode.

Figure 11:
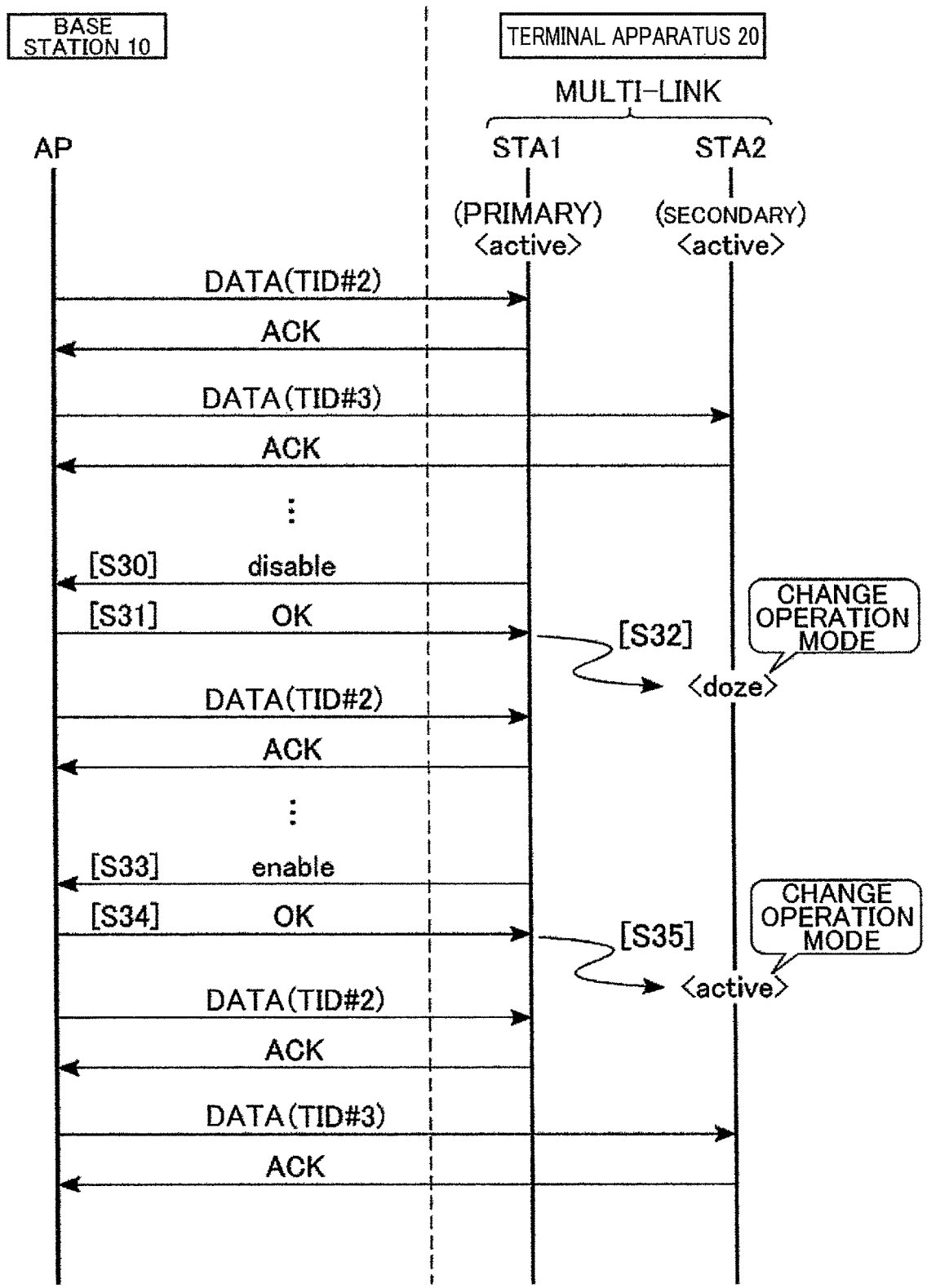
FIG. 11 is a flowchart showing a specific example of a usage method of the multi-link power save in the wireless system according to the embodiment.

FIG. 11 shows an example of a usage method of the multi-link power save in the wireless system 1 according to the embodiment. In the initial state of this example, the link state shown in FIG. 9 is set. Then, each of STA1 and STA2 is set to the active mode. As shown in FIG. 11, when each of STA1 and STA2 is in the active mode, the data of TID #2 and the data of TID #3 can be transmitted and received.

When the link management unit 220 of the terminal apparatus detects that the first condition is satisfied, it transmits a Doze transition notification signal to the access point AP using the primary link (STA1) (step S30). The first condition corresponds to, for example, the fact that the traffic of the secondary link (STA2) is not accumulated. The Doze transition notification signal is a signal for notifying of the transition to the Doze state, and corresponds to the illustrated "disable". The terminal apparatus 20 can know the traffic information by receiving the beacon signal of the base station 10 using at least one of STA1 and STA2.

When the STA1 of the base station 10 receives the Doze transition notification signal, the link management unit 120 of the base station 10 checks whether the transition to the operation pause mode of the secondary link can be permitted. Then, when the transition to the operation pause mode of the secondary link can be permitted, the link management unit 220 of the terminal apparatus 20 transmits an affirmative response ("OK") to the terminal apparatus 20 via STA1 or STA2 (step S31). The link management unit 120 of the base station 10 may transmit a negative response ("NO") to the base station 10 via STA1 or STA2 when the transition to the operation pause mode of the secondary link cannot be permitted.

When the terminal apparatus 20 receives the affirmative response in step S31, the link management unit 220 of the terminal apparatus 20 changes the STA2 set as the secondary link to the operation pause mode (Doze state) (step S32). As a result, STA1 and STA2 of the terminal apparatus 20 are put into the Awake state and the Doze state, respectively. At this time, the multi-link is in a state where only the data of TID #2 can be transmitted and received.

After that, when the link management unit 220 of the terminal apparatus 20 detects that the second condition is satisfied, it transmits an Awake transition request signal to the access point AP using the primary link (STA1) (step S33). The Awake transition request signal is a signal requesting the transition to the Awake state, and corresponds to the illustrated "enable". The second condition corresponds to, for example, the fact that the traffic of the secondary link (STA2) is accumulated. The terminal apparatus 20 can know the traffic information by receiving the beacon signal of the base station 10 using the STA1 in the active state.

When the STA1 of the base station 10 receives the Awake transition request signal, the link management unit 120 of the base station 10 transmits an affirmative response ("OK") to the terminal apparatus 20 via the STA1 corresponding to the primary link (step S34). When the terminal apparatus 20 receives the affirmative response in step S34, the link management unit 220 of the terminal apparatus 20 changes the STA2 set as the secondary link to the active mode (step S35). As a result, each of STA1 and STA2 of the terminal apparatus 20 is in the Awake state. As a result, the multi-link is in a state where, for example, any data of TID #1 to #3 can be transmitted and received.

Figure 12:
FIG. 12 is a table showing an example of changes in link management information according to the usage example of the multi-link power save described in FIG. 11.

FIG. 12 shows an example of changes in the link management information 121 according to the usage example of the multi-link power save described with reference to FIG. 11. As shown in FIG. 12, the on/off of the multi-link power save is applied by the Doze transition notification signal and the Awake transition request signal, respectively. Specifically, after the multi-link is set, the secondary link in the active mode transitions to the operation pause mode when the terminal apparatus 20 transmits a Doze transition notification signal to the base station 10, and the secondary link in the operation pause mode transitions to the active mode when the terminal apparatus 20 transmits an Awake transition request signal to the base station 10.

As described above, in the wireless system 1 according to the embodiment, the base station 10 and the terminal apparatus 20 can change the operation mode of the secondary link by transmitting the Awake transition request signal/Doze transition notification signal. The transmission of the Awake transition request signal is executed using the primary link or other enabled links. The transmission of the Doze transition notification signal is executed using the primary link or the disabled link (the link to transition to the operation pause mode).

The Awake transition request signal and the Doze transition notification signal may be transmitted from either the access point AP or the terminal apparatus 20. When the first and second conditions are based on the stagnation of traffic (buffer state), the change of the operation mode is executed, for example, triggered by the fact that the traffic accumulated in the buffer exceeds a predetermined threshold value. In addition, an intermittent operation mode may be applied to the primary link. In this case, the primary link operates so that it can receive a beacon signal including at least multi-link control information.

<2-4> Link Enable/Disable Process

The wireless system 1 according to the embodiment can control the enable/disable of the secondary link based on a predetermined condition during the multi-link. In the following, the process of enabling the secondary link is referred to as the link enable process. The process of disabling the secondary link is called the link disable process. In the present embodiment, it is assumed that one TID is associated with two links, a primary link and a secondary link, and the primary link is used as the main link.

(Link Enable Process)

Figure 13:
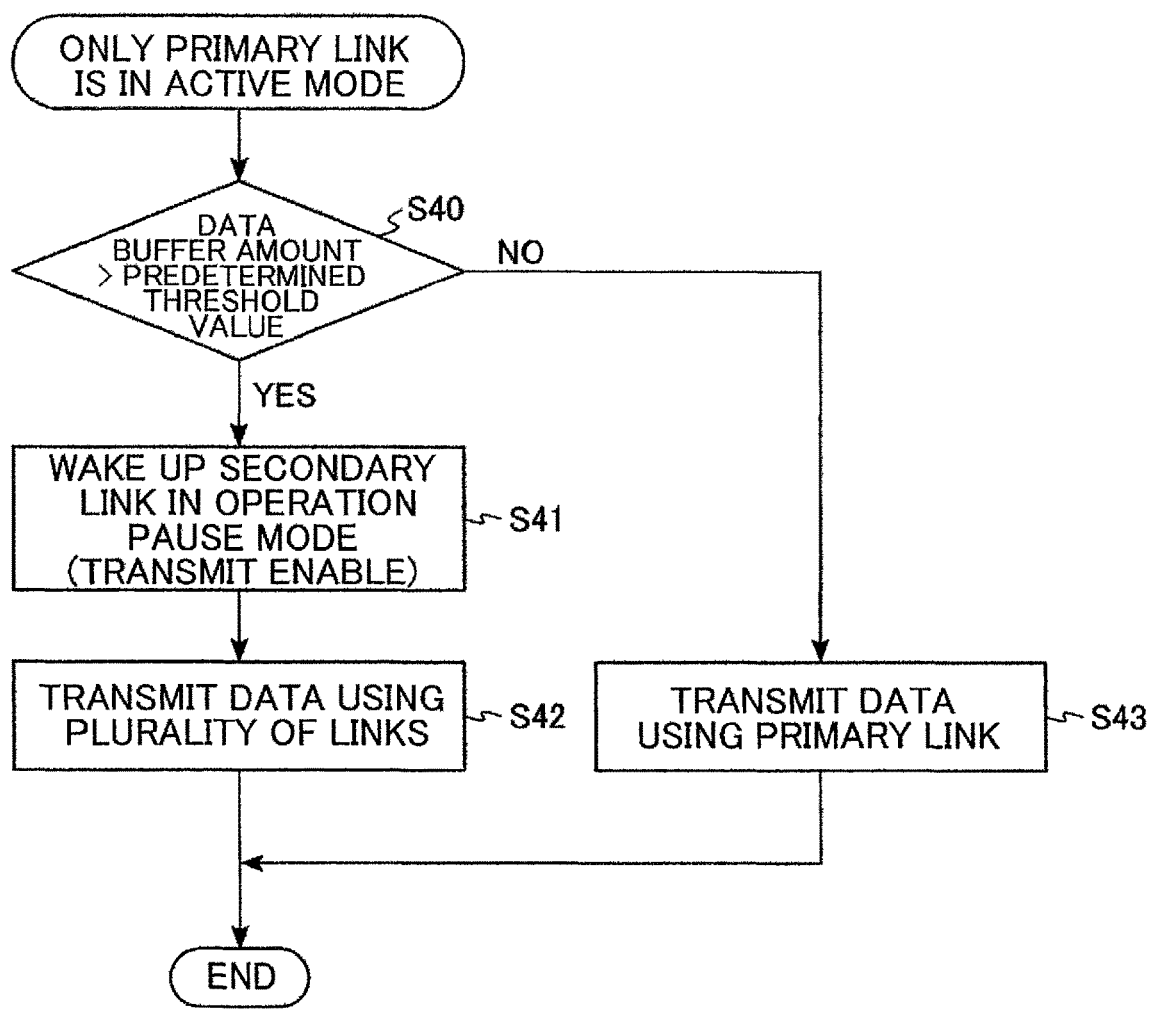
FIG. 13 is a flowchart showing an example of execution conditions of a link enable process in the wireless system according to the embodiment.

First, an example of the condition for executing the link enable process will be described. FIG. 13 is a flowchart showing an example of execution conditions of the link enable process in the wireless system 1 according to the embodiment. The link management units 120 and 220 execute a series of processes shown in FIG. 13 when only the primary link is in the active mode during the multi-link. Specifically, first, each of the link management units 120 and 220 monitors the data buffer amount of which the transmission is allocated to the TID, and checks whether the data buffer amount exceeds a predetermined threshold value (step S40).

When the data buffer amount exceeds a predetermined threshold value, an Awake transition request signal is transmitted between the link management unit 120 of the base station 10 and the link management unit 220 of the terminal apparatus 20, and the secondary link in the Doze state wakes up (step S41). In other words, when the link enable process is executed, the STA function of the terminal apparatus 20 set as the secondary link transitions from the operation pause mode to the active mode. After that, one of the link management units 120 and 220 transmits data using a plurality of links (primary link and secondary link) constituting the multi-link (step S42).

On the other hand, when the data buffer amount does not exceed a predetermined threshold value, either the link management unit 120 or 220 transmits data using the primary link (step S43). In other words, any of the link management units 120 and 220 transmits the data using the multi-link substantially as a single link. Each of the link management units 120 and 220 executes the process described above when the data of which the transmission is allocated to the multi-link is buffered.

(Link Disable Process)

Figure 14:
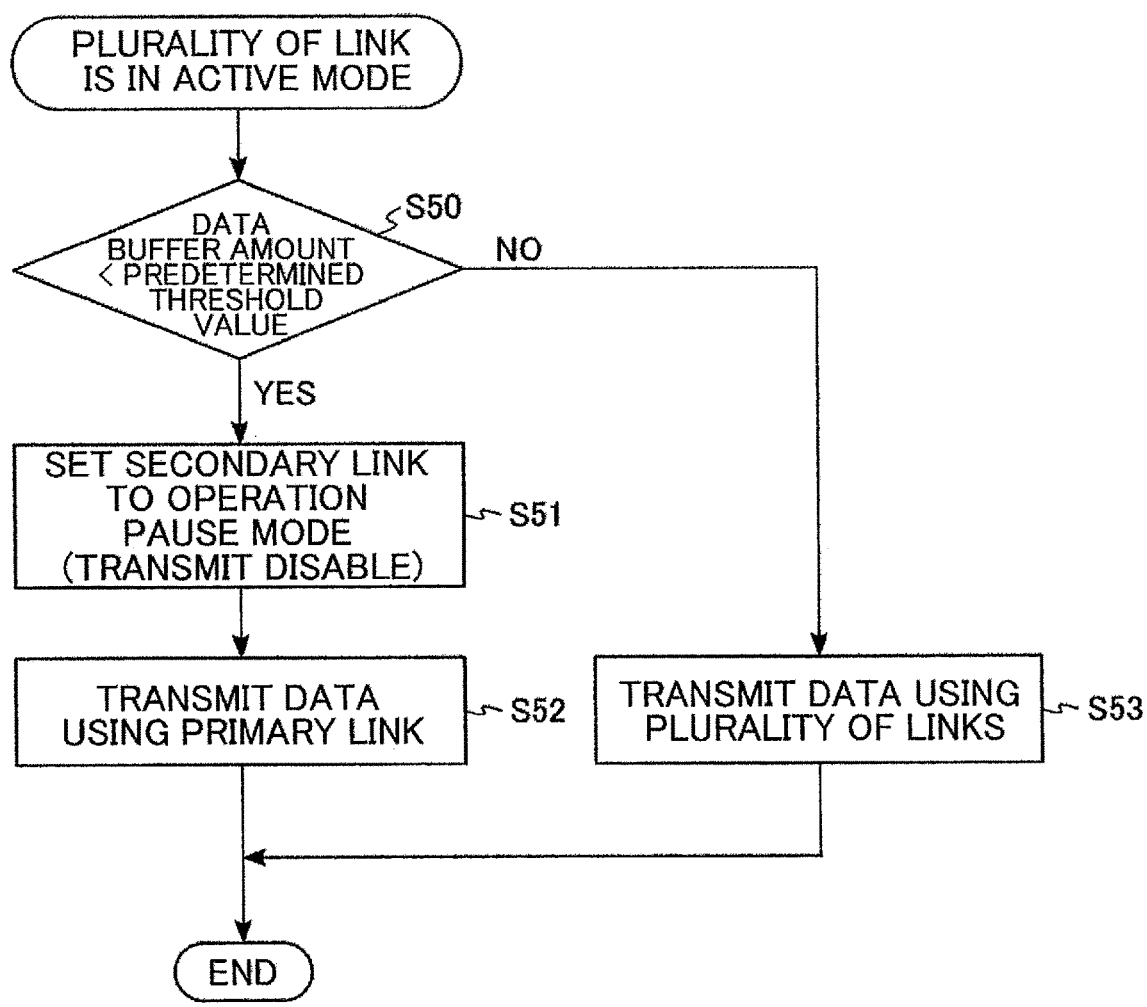
FIG. 14 is a flowchart showing an example of execution conditions of a link disable process in the wireless system according to the embodiment.

Next, an example of the condition for executing the link disable process will be described. FIG. 14 is a flowchart showing an example of execution conditions of the link disable process in the wireless system 1 according to the embodiment. The link management units 120 and 220 execute a series of processes shown in FIG. 14 when a plurality of links are in the active mode during the multi-link.

Specifically, first, each of the link management units 120 and 220 monitors the data buffer amount of which the transmission is allocated to the TID, and checks whether the data buffer amount is less than a predetermined threshold value (step S50).

When the data buffer amount is less than a predetermined threshold value, a Doze transition notification signal is transmitted between the link management unit 120 of the base station 10 and the link management unit 220 of the terminal apparatus 20, and the secondary link in the active mode is set to the operation pause mode (Doze state) (step S51). In other words, when the link disable process is executed, the STA function of the terminal apparatus 20 set as the secondary link transitions from the active mode to the operation pause mode. After that, either the link management unit 120 or 220 transmits data using the primary link (step S52).

On the other hand, when the data buffer amount exceeds a predetermined threshold value, one of the link management units 120 and 220 transmits data using a plurality of links (primary link and secondary link) constituting the multi-link (step S53). Each of the link management units 120 and 220 executes the process described above when the data of which the transmission is allocated to the multi-link is buffered.

(Specific Example of Link Enable/Disable Process)

Figure 15:
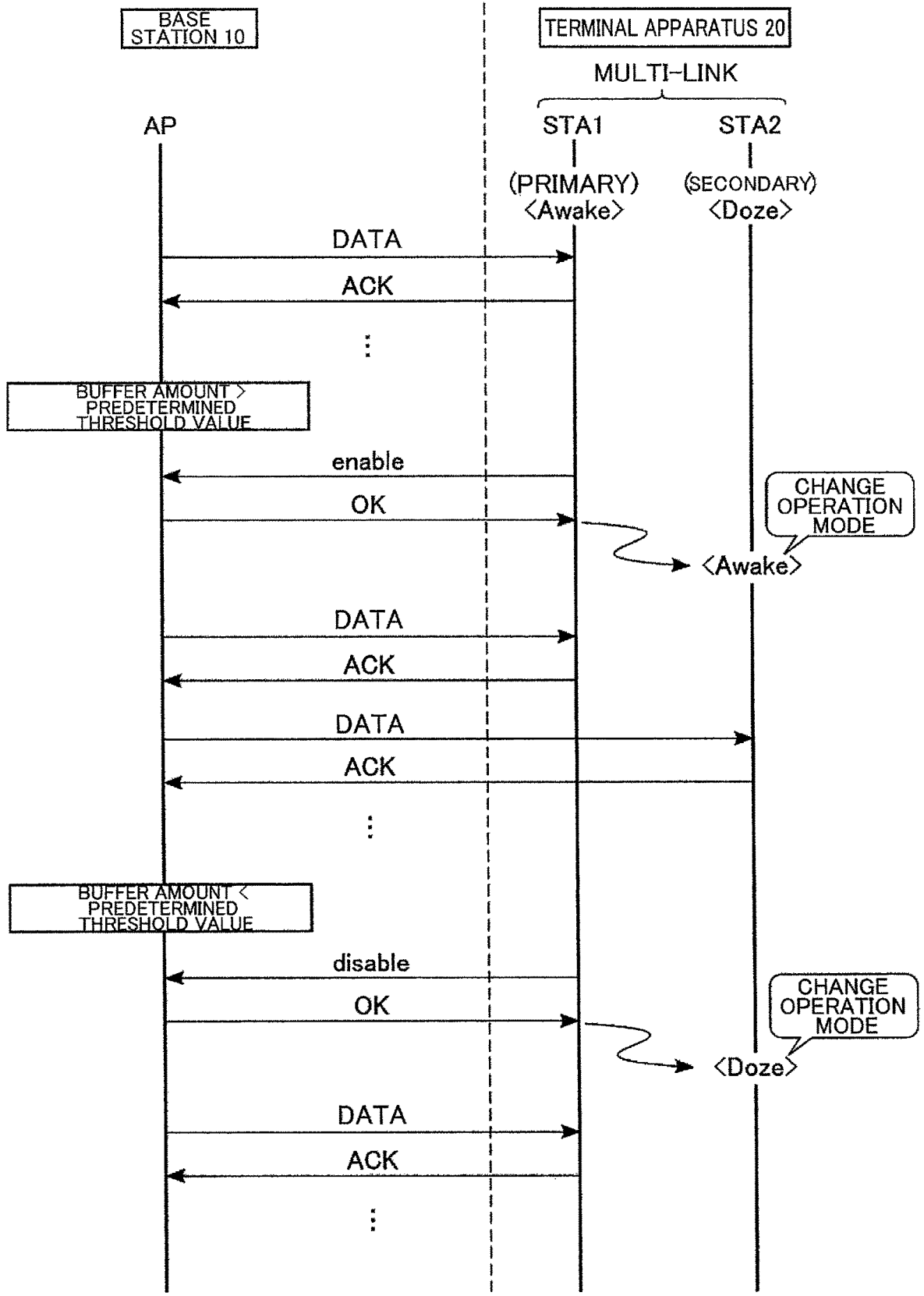
FIG. 15 is a flowchart showing a specific example of the link enable/disable process in the wireless system according to the embodiment.

Next, a specific example of the link enable/disable process will be described with reference to FIG. 15. FIG. 15 is a flowchart showing a specific example of the link enable/disable process in the wireless system 1 according to the embodiment. In the initial state of this example, the link state of the Doze state shown in FIG. 12 is set.

As shown in FIG. 15, when STA1 and STA2 are in the Awake state and the Doze state, respectively, data can be transmitted and received using STA1. After that, when the link management unit 120 of the base station 10 detects that "(buffer amount)>(predetermined threshold value)" is satisfied, the terminal apparatus 20 is notified of the fact that "(buffer amount)>(predetermined threshold value)" is satisfied using a beacon signal (not shown).

Then, the link management unit 220 of the terminal apparatus 20 transmits the Awake transition request signal to the access point AP using the primary link (STA1). When the STA1 of the base station 10 receives the Awake transition request signal, the link management unit 120 of the base station 10 transmits an affirmative response ("OK") to the terminal apparatus 20 via the primary link (STA1) when the transition of the secondary link to the active mode can be permitted. When the terminal apparatus receives an affirmative response to the Awake transition request signal, the link management unit 220 of the terminal apparatus 20 changes the operation mode of the STA 2 set as the secondary link from the operation pause mode to the active mode. As a result, each of STA1 and STA2 of the terminal apparatus 20 is in the Awake state. That is, the multi-link is in a state where data can be transmitted and received using both the primary link (STA1) and the secondary link (STA2).

On the other hand, when the link management unit 120 of the base station 10 detects that "(buffer amount)<(predetermined threshold value)" is satisfied when each of the STA 1 and the STA 2 is in the active mode, for example, the terminal apparatus 20 is notified of the fact that "(buffer amount)<(predetermined threshold value)" is satisfied using a beacon signal (not shown).

Then, the link management unit 220 of the terminal apparatus 20 transmits the Doze transition notification signal to the access point AP using the primary link (STA1). When the STA1 of the base station 10 receives the Doze transition notification signal, the link management unit 120 of the base station 10 transmits an affirmative response ("OK") to the terminal apparatus 20 via the primary link (STA1) or the secondary link (STA2) when the transition to the operation pause mode of the secondary link can be permitted. When the terminal apparatus 20 receives an affirmative response to the Doze transition notification signal, the link management unit 220 of the terminal apparatus 20 changes the operation mode of the STA 2 set as the secondary link from the active mode to the operation pause mode. As a result, STA1 and STA2 of the terminal apparatus 20 are in the Awake state and the Doze state, respectively. That is, the multi-link is in a state where data can be transmitted and received using only the primary link (STA1).

In the link enable process and the link disable process described above, the predetermined threshold value used in the link enable process is set to be equal to or higher than the predetermined threshold value used in the link disable process. As described above, the predetermined threshold value used in the link enable process and the predetermined threshold value used in the link disable process may be different. By providing a margin to these threshold values, the wireless system 1 can suppress the frequent occurrence of the link enable process and the link disable process when the data buffer amount is near each threshold value.

(Wireless Frame Used in Link Enable/Disable Process)

Figure 16:
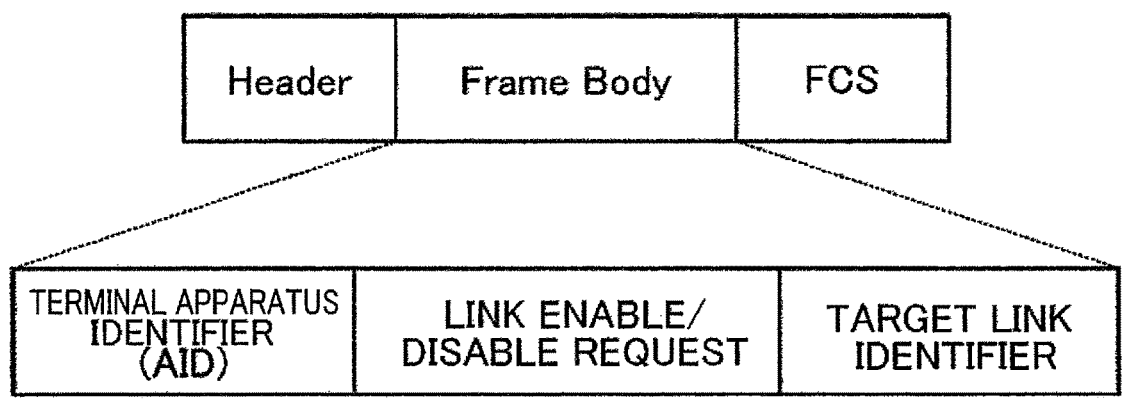
FIG. 16 is a conceptual diagram showing a specific example of a wireless frame used in the link enable/disable process of the wireless system according to the embodiment.
Figure 17:
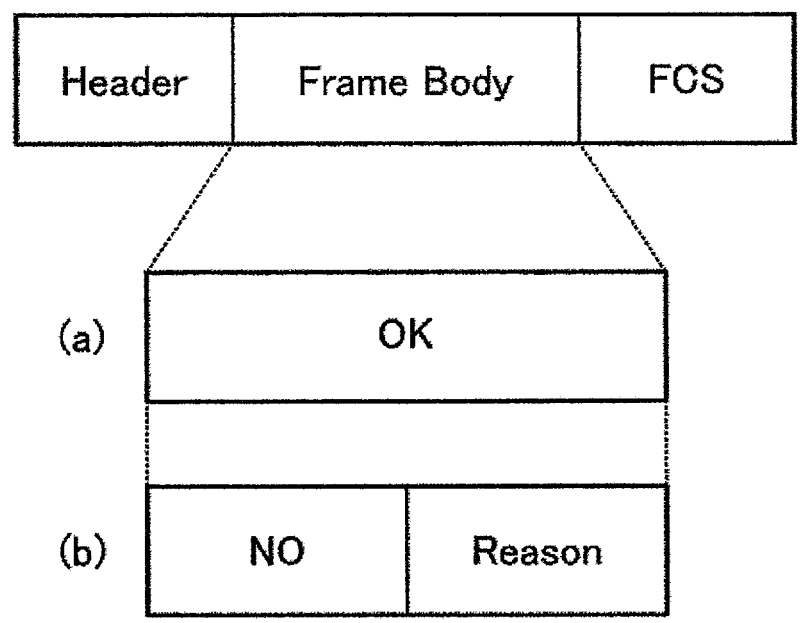
FIG. 17 is a conceptual diagram showing a specific example of a wireless frame used in the link enable/disable process of the wireless system according to the embodiment.

FIGS. 16 and 17 show specific examples of the wireless frame used in the link enable/disable process of the wireless system 1 according to the embodiment. FIG. 16 corresponds to a wireless frame transmitted when the access point AP requests the terminal apparatus 20 to enable/disable the link. FIG. 17 corresponds to a wireless frame that the terminal apparatus 20 returns to the access point AP in response to the link enable/disable request.

As shown in FIG. 16, the Frame Body of the wireless frame requesting the change of the primary link includes, for example, a terminal apparatus identifier AID (Association Identifier), a link enable/disable request, and an identifier of the next target link. The link management unit 220 of the terminal apparatus 20 corresponding to the AID refers to the "identifier of target link" based on the "link enable/disable request" and determines whether the link can be enabled/disabled.

When the link can be enabled/disabled, the Frame Body of the wireless frame corresponding to the response to the link enable/disable request, that is, the affirmative response, includes "OK" as shown in FIG. 17(a). "OK" corresponds to a bit that notifies that the link can be enabled/disabled.

On the other hand, when the link cannot be enabled/disabled, the Frame Body of the wireless frame corresponding to the response to the link enable/disable request, that is, the negative response includes "NO" and "Reason" as shown in FIG. 17(b). "NO" corresponds to a bit that notifies that the link cannot be enabled/disabled. "Reason" corresponds to a bit that notifies of the reason why the link cannot be enabled/disabled. Note that "Reason" in the wireless frame corresponding to the response to the link enable/disable request may be omitted.

<3> EFFECT OF EMBODIMENT

According to the wireless system 1 according to the embodiment described above, the power consumption of the terminal apparatus 20 during the multi-link can be suppressed. The effect of the wireless system 1 according to the embodiment will be described in detail hereinafter.

Base stations and terminal apparatuses that use a wireless LAN include a plurality of STA functions provided for each band used, for example, 2.4 GHz, 5 GHz, and 6 GHz, in some cases. In such a wireless system, for example, by selecting one STA function among a plurality of STA functions, a wireless connection is established and data communication between the base station and the terminal apparatus is performed. At this time, in the wireless system, the unselected STA function is not used even if there is a base station corresponding to the band of the STA function.

In contrast to this, the wireless system 1 according to the embodiment utilizes a plurality of STA functions provided in each of the base station 10 and the terminal apparatus 20 to establish a multi-link between the base station 10 and the terminal apparatus 20. In multi-link data communication, a plurality of bands can be used together, and the functions of the wireless LAN device can be fully utilized. As a result, the wireless system 1 according to the embodiment can realize efficient communication and can improve the communication speed.

On the other hand, the power consumption of the multi-link is higher than that of the single link because the base station 10 and the terminal apparatus 20 each use a plurality of STA functions. From the viewpoint of power saving, it is preferable that a single link is used when the traffic is not stagnant, and a multi-link is used when the traffic is stagnant.

Therefore, the wireless system 1 according to the embodiment performs data communication by switching between the single link and the multi-link after the multi-link is established. Specifically, after the multi-link is established, the link management unit 120 of the base station 10 and the link management unit 220 of the terminal apparatus 20 control the enable/disable of the secondary link by exchanging an Awake transition request signal/Doze transition notification signal. Here, "enable of link" corresponds to setting of active mode, and "disable of link" corresponds to setting of operation pause mode.

Then, in the wireless system 1 according to the embodiment, the enable/disable of the secondary link is determined based on the buffer amount of the transmitted data. For example, when the data buffer amount is large, high-speed data communication using a plurality of links constituting the multi-link is executed. On the other hand, when the data buffer amount is small, only one (primary link) of the plurality of links constituting the multi-link is set to the active mode, and the other links (secondary links) are set to the operation pause mode. In this case, the multi-link executes data communication in a state substantially similar to that of a single link.

As described above, the wireless system 1 according to the embodiment uses the multi-link setting that prioritizes performance when the data buffer amount is large, and uses the multi-link setting that prioritizes power saving when the data buffer amount is small. As a result, the wireless system 1 according to the embodiment can suppress the stagnation of traffic and the power consumption of the terminal apparatus 20.

<4> MODIFIED EXAMPLE OF EMBODIMENT

The execution conditions and usage methods of the link enable/disable process described in the embodiment are merely examples. A wireless system 1 according to first to fifth modified examples of the embodiment will be described hereinafter.

<4-1> First Modified Example

Figure 18:
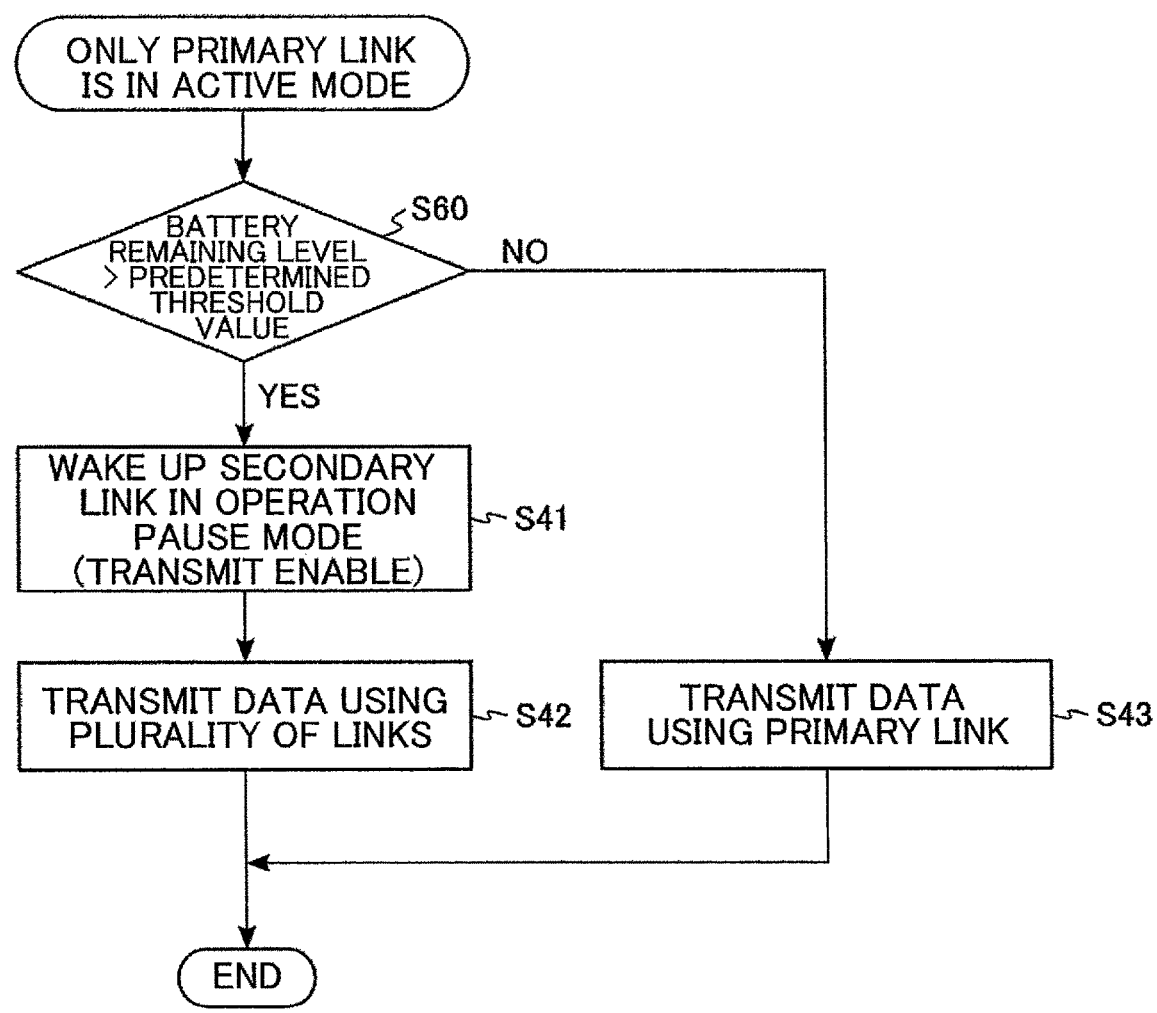
FIG. 18 is a flowchart showing an example of execution conditions of a link enable process in a wireless system according to a first modified example of the embodiment.

FIG. 18 is a flowchart showing an example of execution conditions of the link enable process in the first modified example of the embodiment. The flowchart shown in FIG. 18 has a configuration in which step S40 of the flowchart shown in FIG. 13 is replaced with step S60.

In the process of step S60, one of the link management units 120 and 220 monitors the remaining battery level of the terminal apparatus 20 and checks whether the remaining battery level exceeds a predetermined threshold value (step S60). When "(remaining battery level)>(predetermined threshold value)" is satisfied (step S60: YES), the process proceeds to step S41, and the link enable process is executed. On the other hand, if "(remaining battery level)> (predetermined threshold value)" is not satisfied (step S60: NO), the process of step S43 is executed.

Figure 19:
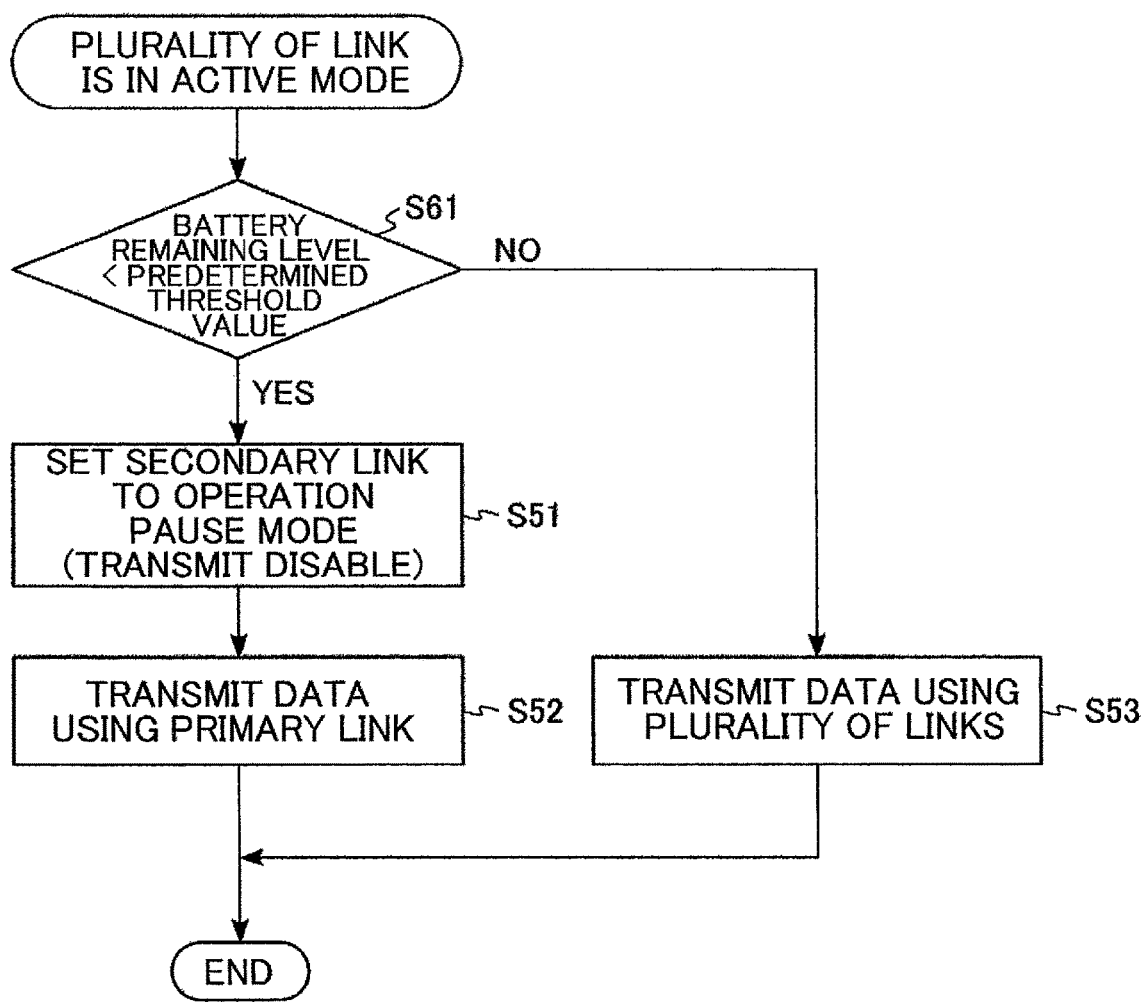
FIG. 19 is a flowchart showing an example of execution conditions of a link disable process in the wireless system according to the first modified example of the embodiment.

FIG. 19 is a flowchart showing an example of execution conditions of the link disable process in the first modified example of the embodiment. The flowchart shown in FIG. 19 has a configuration in which step S50 of the flowchart shown in FIG. 14 is replaced with step S61.

In the process of step S61, one of the link management units 120 and 220 monitors the remaining battery level of the terminal apparatus 20 and checks whether the remaining battery level is less than a predetermined threshold value (step S61). When "(remaining battery level)<(predetermined threshold value)" is satisfied (step S61: Yes), the process proceeds to the process of step S51, and the link disable process is executed. On the other hand, if "(remaining battery level)<(predetermined threshold value)" is not satisfied (step S61: NO), the process of step S53 is executed. Other configurations and operations of the wireless system 1 according to the first modified example of the embodiment are the same as those of the embodiment.

As described above, the remaining battery level of the terminal apparatus 20 may be used as the execution condition of the link enable/disable process. In the first modified example of the embodiment, the multi-link setting that prioritizes performance is used when the remaining battery level of the terminal apparatus 20 is high, and the multi-link setting that prioritizes power saving is used when the remaining battery level of the terminal apparatus 20 is low. The wireless system 1 according to the first modified example of the embodiment can suppress the power consumption of the terminal apparatus 20 by changing the number of links used according to the remaining battery level of the terminal apparatus 20 in this way.

In the link enable process and the link disable process described above, the predetermined threshold value used in the link enable process is set to be equal to or higher than the predetermined threshold value used in the link disable process. As described above, the predetermined threshold value used in the link enable process and the predetermined threshold value used in the link disable process may be the same or different. By providing a margin to these threshold values, the wireless system 1 can suppress the frequent occurrence of the link enable process and the link disable process when the remaining battery level is near each threshold value.

<4-2> Second Modified Example

Figure 20:
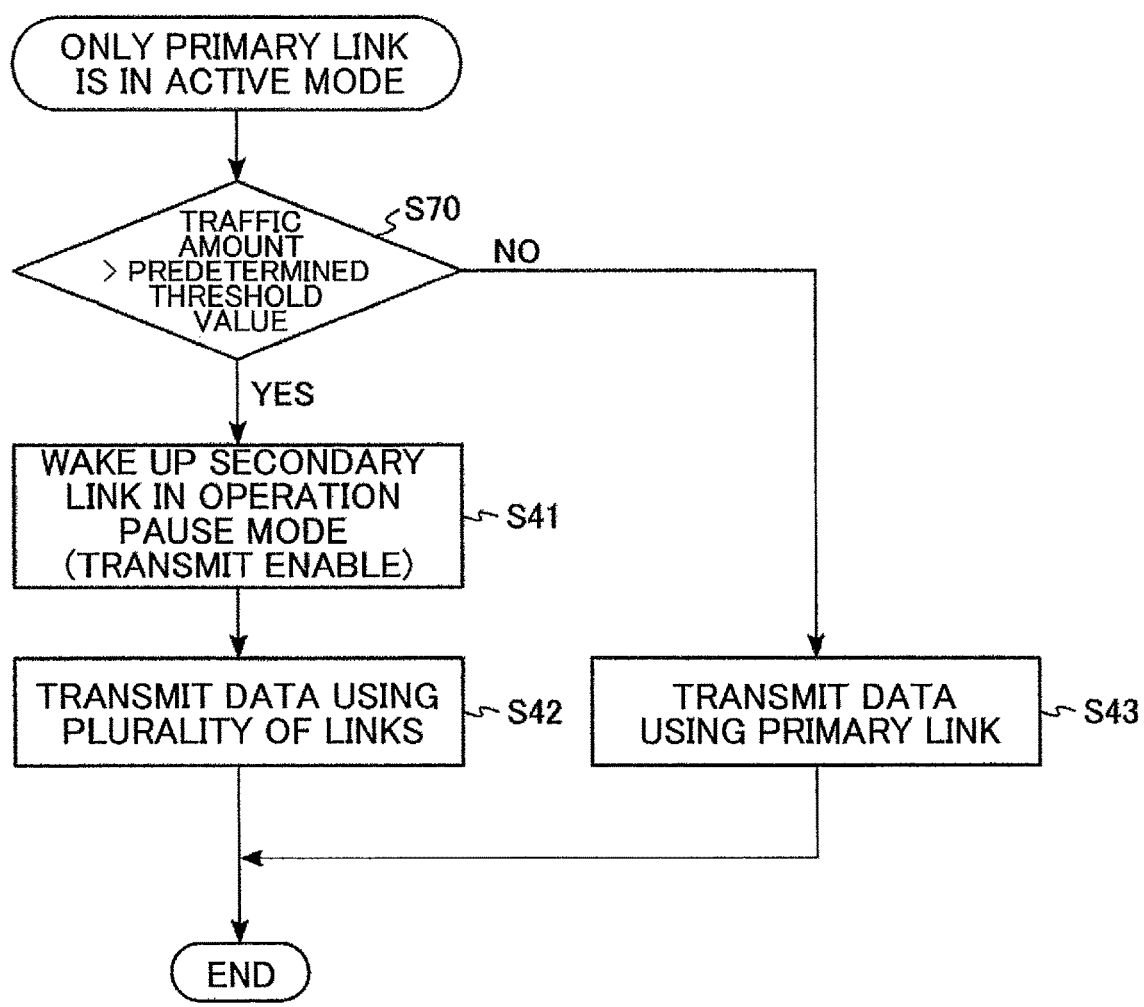
FIG. 20 is a flowchart showing an example of execution conditions of a link enable process in a wireless system according to a second modified example of the embodiment.

FIG. 20 is a flowchart showing an example of execution conditions of the link enable process in the second modified example of the embodiment. The flowchart shown in FIG. 20 has a configuration in which step S40 of the flowchart shown in FIG. 13 is replaced with step S70.

In the process of step S70, each of the link management units 120 and 220 monitors the total traffic amount (independent of TID) allocated to the multi-link, and determines whether the traffic amount exceeds a predetermined threshold value (step S70). The traffic to be monitored is not limited to the total traffic amount, and at least one specific TID may be selected. When "(traffic amount)>(predetermined threshold value)" is satisfied (step S70: YES), the process proceeds to step S41, and the link enable process is executed. On the other hand, when "(traffic amount)>(predetermined threshold value)" is not satisfied (step S70: NO), the process of step S43 is executed.

Figure 21:
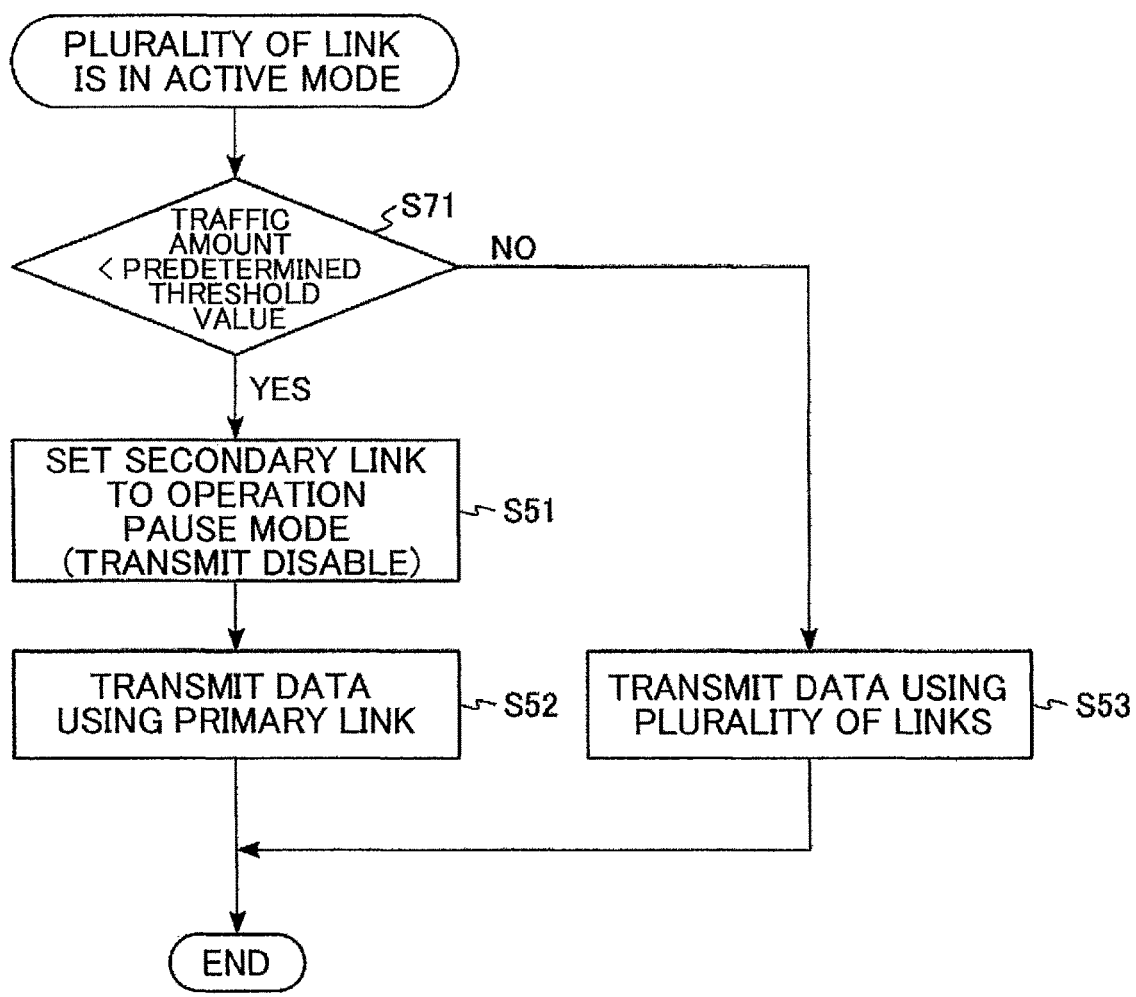
FIG. 21 is a flowchart showing an example of execution conditions of a link disable process in the wireless system according to the second modified example of the embodiment.

FIG. 21 is a flowchart showing an example of execution conditions of the link disable process in the second modified example of the embodiment. The flowchart shown in FIG. 21 has a configuration in which step S50 of the flowchart shown in FIG. 14 is replaced with step S71.

In the process of step S71, each of the link management units 120 and 220 monitors the traffic amount allocated to the multi-link and checks whether the traffic amount is less than a predetermined threshold value (step S71). When "(remaining battery level)<(predetermined threshold value)" is satisfied (step S71: YES), the process proceeds to step S41, and the link disable process is executed. On the other hand, if "(traffic amount)<(predetermined threshold value)" is not satisfied (step S71: NO), the process of step S53 is executed.

The "predetermined threshold value" used in this modified example is set for each traffic type, for example. In this case, each of the processes of steps S70 and S71 described above is executed for each traffic type. For example, each of the link management units 120 and 220 executes the link enable process when "YES" is obtained in the determination of step S70 corresponding to at least one of the plurality of traffic types. Similarly, each of the link management units 120 and 220 executes the link disable process when "YES" is obtained in the determination of step S71 corresponding to at least one of the plurality of traffic types. Other configurations and operations of the wireless system 1 according to the second modified example of the embodiment are the same as those of the embodiment.

As described above, the traffic amount may be used as the execution condition of the link enable/disable process. In the second modified example of the embodiment, the multi-link setting that prioritizes performance is used when the traffic amount is large, and the multi-link setting which prioritizes power saving is used when the traffic amount is small. The wireless system 1 according to the second modified example of the embodiment can obtain the same effect as that of the embodiment by changing the number of links used according to the traffic amount in this way.

In the link enable process and the link disable process described above, the predetermined threshold value used in the link enable process is set to be equal to or higher than the predetermined threshold value used in the link disable process. As described above, the predetermined threshold value used in the link enable process and the predetermined threshold value used in the link disable process may be the same or different. By providing a margin to these threshold values, the wireless system 1 can suppress the frequent occurrence of the link enable process and the link disable process when the traffic amount is near each threshold value.

<4-3> Third Modified Example

Figure 22:
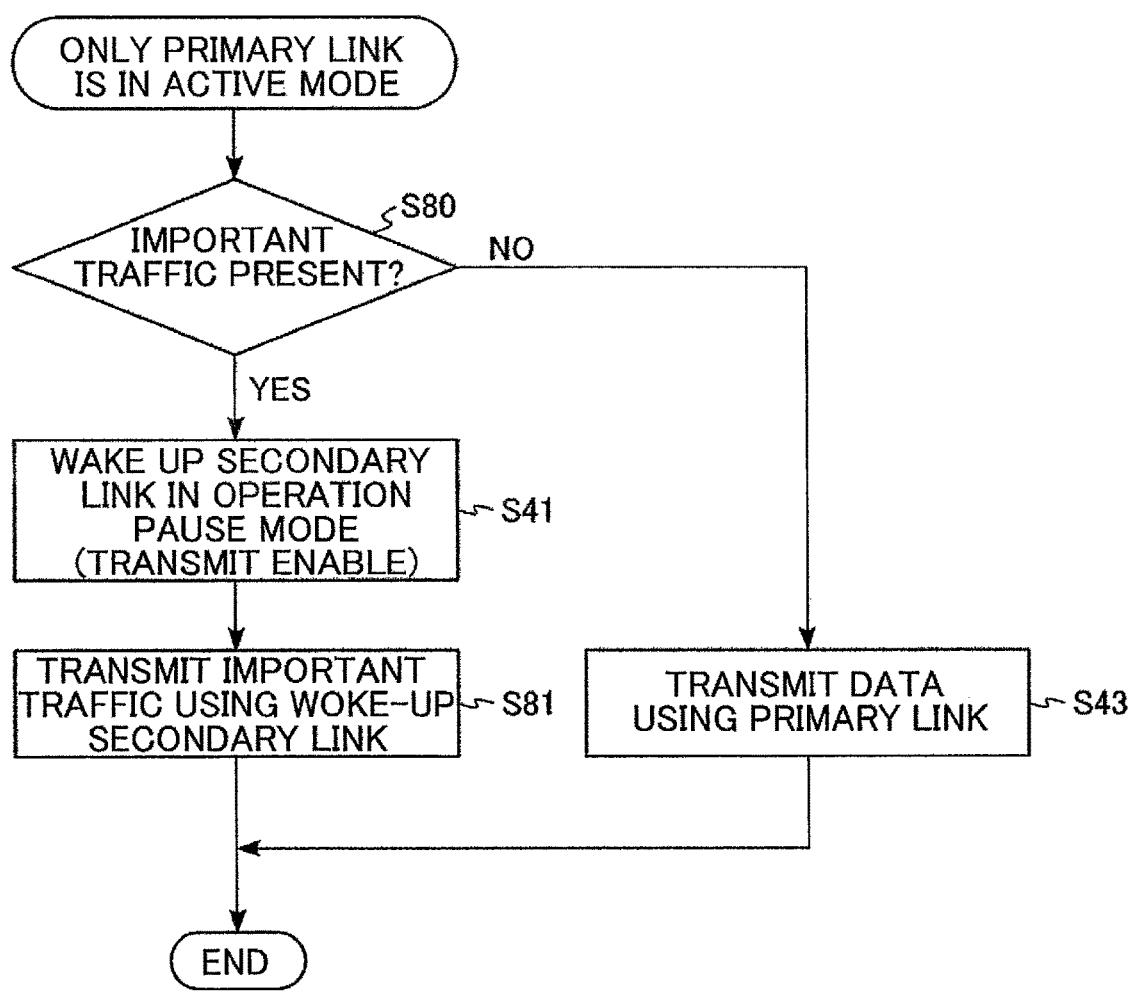
FIG. 22 is a flowchart showing an example of execution conditions of a link enable process in a wireless system according to a third modified example of the embodiment.

FIG. 22 is a flowchart showing an example of execution conditions of the link enable process in the third modified example of the embodiment. The flowchart shown in FIG. 22 has a configuration in which steps S40 and S42 of the flowchart shown in FIG. 13 are replaced with steps S80 and 82, respectively.

In the process of step S80, each of the link management units 120 and 220 checks whether there is important traffic in the traffic accumulated in the multi-link. When there is important traffic (step S80: YES), the process proceeds to step S41 to execute the link enable process, and important traffic is transmitted using the woke-up secondary link in the subsequent process of step S81. On the other hand, if there is no important traffic (step S80: NO), the process of step S43 is executed.

Figure 23:
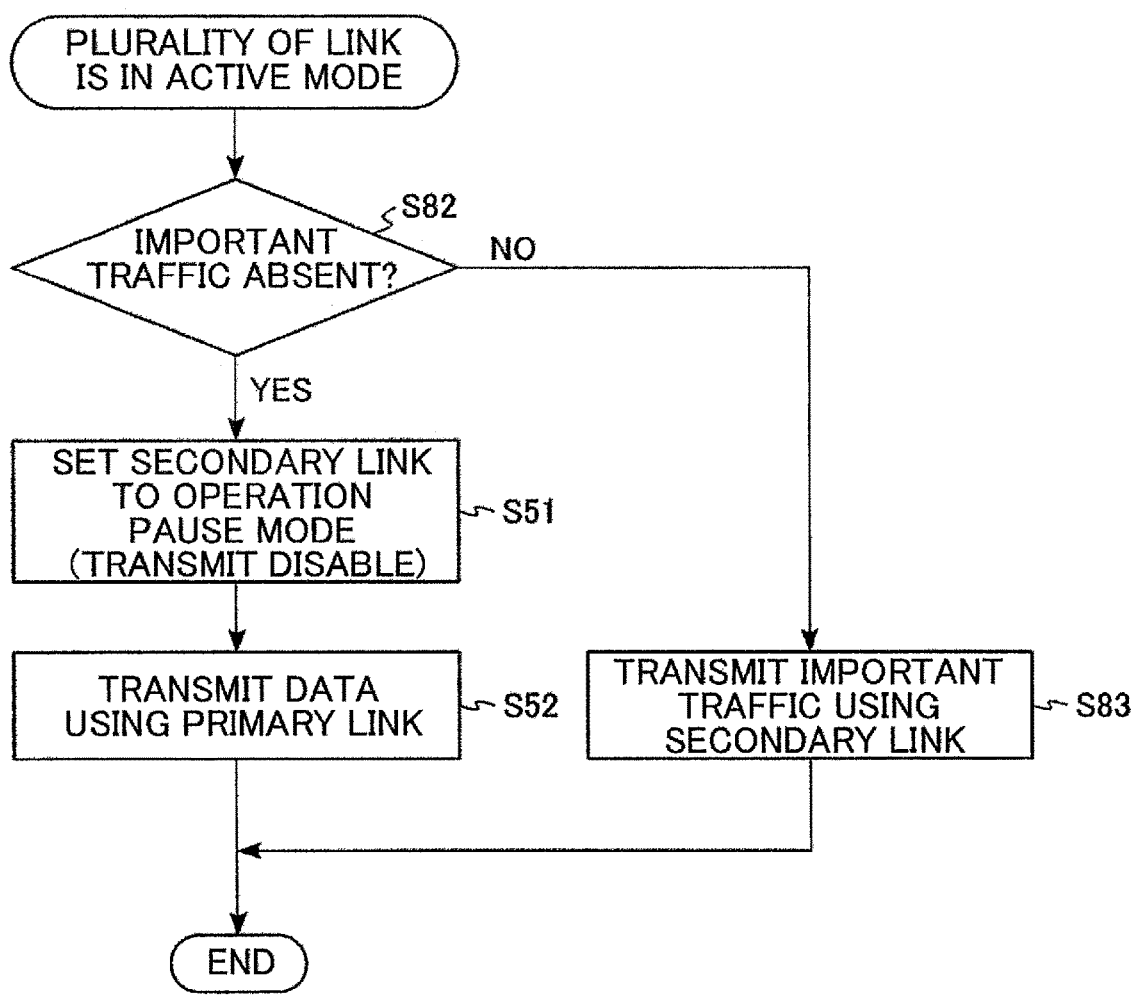
FIG. 23 is a flowchart showing an example of execution conditions of a link disable process in the wireless system according to the third modified example of the embodiment.

FIG. 23 is a flowchart showing an example of the execution condition of the link disable process in the second modified example of the embodiment. The flowchart shown in FIG. 23 has a configuration in which steps S50 and S53 of the flowchart shown in FIG. 14 are replaced with steps S82 and S83, respectively.

In the process of step S82, each of the link management units 120 and 220 checks whether there is important traffic in the traffic accumulated in the multi-link. If there is no important traffic (step S82: YES), the process proceeds to step S51 and the link disable process is executed. On the other hand, if there is important traffic (step S82: NO), important traffic is transmitted using the secondary link in the process of step S83.

The "important traffic" used in this modified example is set to, for example, Low Latency (LL) traffic. The important traffic may be any traffic that requires high reliability from the upper level, and is not limited to the LL traffic. Other important traffic includes, for example, traffic including payment information and authentication information. Other configurations and operations of the wireless system 1 according to the third modified example of the embodiment are the same as those of the embodiment.

As described above, the presence of important traffic may be used as the execution condition of the link enable/disable process. In the third modified example of the embodiment, the secondary link is used only for transmitting important traffic when there is important traffic, and the multi-link setting that prioritizes power saving is used when there is no important traffic amount. The wireless system 1 according to the third modified example of the embodiment can improve the communication quality of important traffic by occupying and using the secondary link for important traffic in this way.

<4-4> Fourth Modified Example

The wireless system 1 according to the fourth modified example of the embodiment relates to a control method when the base station 10 establishes a multi-link with each of the plurality of terminal apparatuses 20. In the following, a case where the base station 10 establishes a multi-link with each of the terminal apparatuses 20A and 20B will be described as an example. In this example, the same channel is allocated to the STA1 of the terminal apparatus 20A and the STA1 of the terminal apparatus 20B, and the same channel is allocated to the STA2 of the terminal apparatus 20A and the STA2 of the terminal apparatus 20B.

Figure 24:
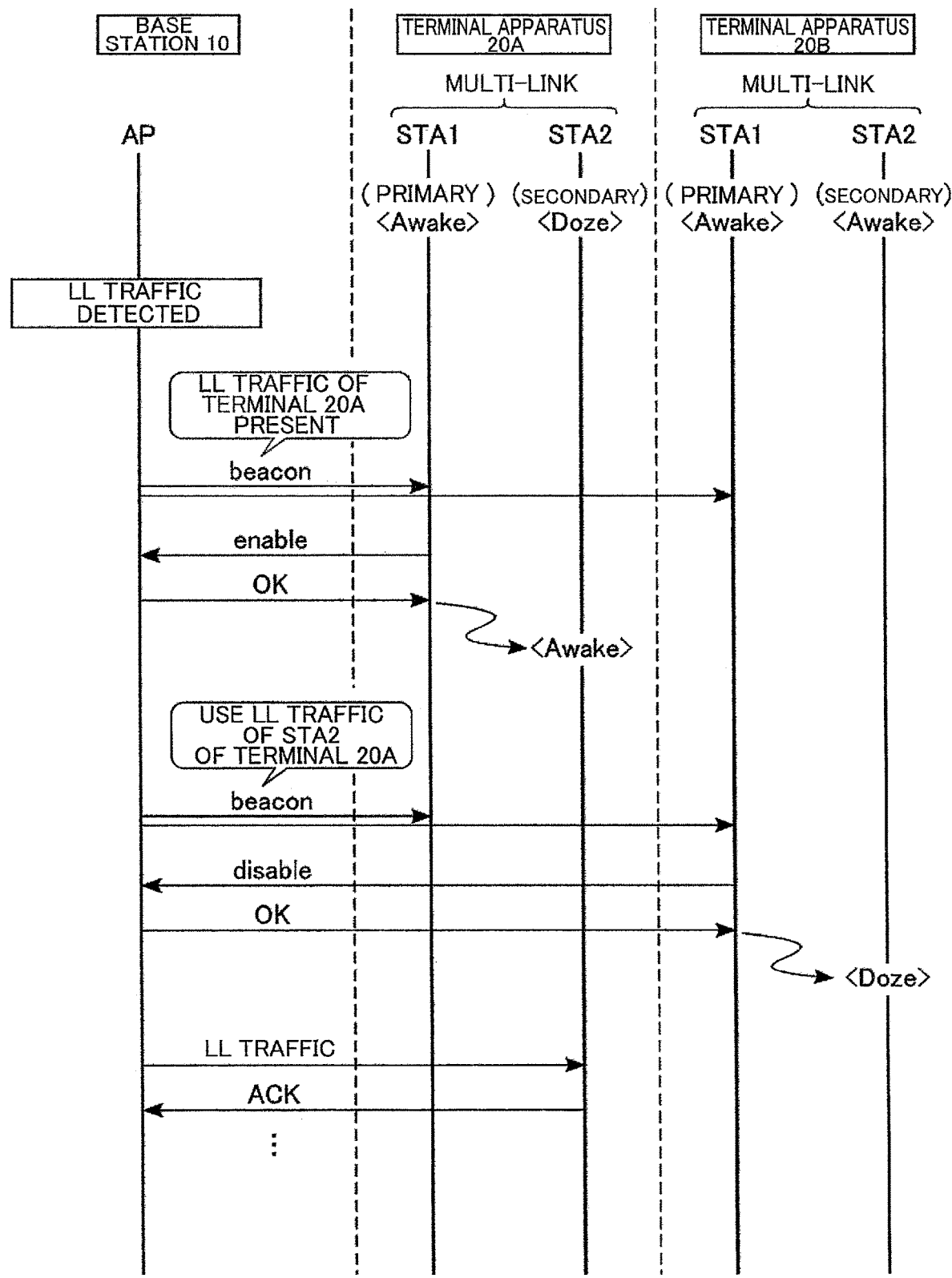
FIG. 24 is a flowchart showing a specific example of the link enable/disable process in the wireless system according to a fourth modified example of the embodiment.

FIG. 24 is a flowchart showing a specific example of the link enable/disable process in the wireless system 1 according to the fourth modified example of the embodiment. In the initial state of this example, STA1 is set as the primary link and STA2 is set as the secondary link in each of the terminal apparatuses 20A and 20B. Further, STA1 and STA2 of the terminal apparatus 20A are set to the Awake state and the Doze state, respectively, and each of the STA1 and STA2 of the terminal apparatus 20B is set to the Awake state.

As shown in FIG. 24, when the access point AP detects the LL traffic, the access point AP transmits a beacon signal including information indicating that the terminal apparatus 20A has the LL traffic, and the beacon signal is received by the primary link (STA1) of each of the terminal apparatuses 20A and 20B. Then, the STA1 of the terminal apparatus 20A transmits an Awake transition request signal to the access point AP, and the access point AP returns an affirmative response to the STA1 of the terminal apparatus 20A. As a result, the STA2 of the terminal apparatus 20A transitions from the operation pause mode to the active mode, and the STA2 of the terminal apparatus 20A is in a state where the LL traffic can be transmitted.

After that, when the access point AP detects the LL traffic in the STA2 of the terminal apparatus 20A, the access point AP transmits a beacon signal including information indicating that the terminal apparatus 20A has the LL traffic, and the beacon signal is received by the primary link (STA1) of each of the terminal apparatuses 20A and 20B. Then, the STA1 of the terminal apparatus 20B transmits a Doze transition notification signal to the access point AP, and the access point AP returns an affirmative response to the STA1 of the terminal apparatus 20B. As a result, the STA2 of the terminal apparatus 20B transitions from the active mode to the operation pause mode.

As a result, the use of the STA2 of the terminal apparatus 20B in which the channel to be used conflicts with the STA2 of the terminal apparatus 20A is stopped, and the Doze state is entered. As a result, the STA2 of the terminal apparatus 20A is in a state where the allocated channel can be exclusively used. The wireless system 1 according to the fourth modified example of the embodiment can improve the communication quality of the LL traffic by exclusively using the channel of the secondary link to which the LL traffic is allocated in this way.

Figure 25:
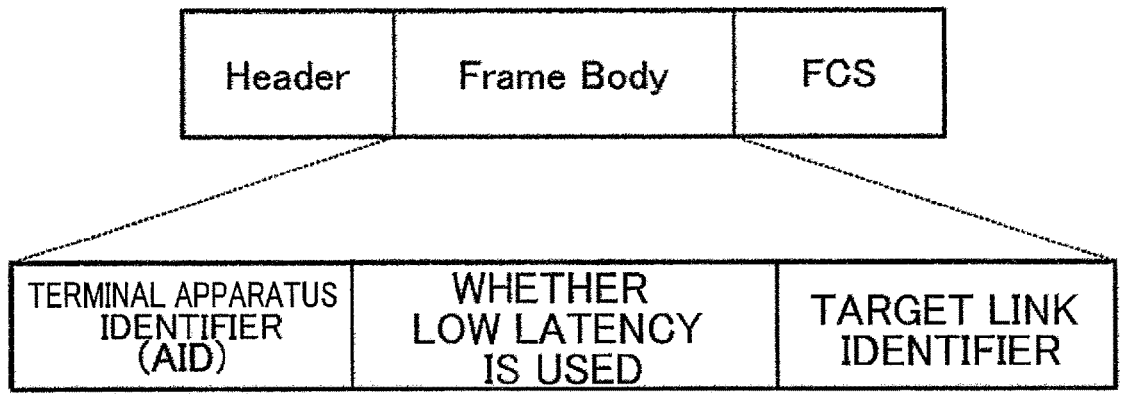
FIG. 25 is a conceptual diagram showing a specific example of a wireless frame used in the link enable/disable process of the wireless system according to the fourth modified example of the embodiment.

FIG. 25 shows a specific example of the wireless frame used in the link enable/disable process of the wireless system 1 according to the fourth modified example of the embodiment, and corresponds to the beacon signal shown in FIG. 24. As shown in FIG. 25, the Frame Body of the wireless frame including the information indicating the presence of LL traffic includes, for example, the terminal apparatus identifier AID (Association Identifier), the information indicating whether Low Latency is used, and the identifier of the target link.

For example, the link management unit 220 of each terminal apparatus 20 checks "whether Low Latency is used (presence of LL traffic)" when the AID included in the beacon signal is different from its own AID. Then, when the link management unit 220 detects that "Low Latency is used", it is checked whether the channel corresponding to the "identifier of the target link" matches the channel used in its own multi-link. When the link management unit 220 detects a channel match, the link management unit 220 executes a link disable process for the secondary link corresponding to the channel. In this way, the wireless system 1 can perform the operation described with reference to FIG. 24.

In the above description, the case where the channel of the secondary link used for transmission of the LL traffic is exclusively used based on the presence of the LL traffic has been illustrated, but the present invention is not limited to this. For example, other important traffic may be used instead of the LL traffic. A plurality of types of sets of information shown in FIG. 25 may be included in one beacon signal.

<4-5> Fifth Modified Example

The wireless system 1 according to the fifth modified example of the embodiment establishes the same multi-link as in the embodiment using a plurality of channels CH included in the same frequency band. The multi-link processing in the fifth modified example of the embodiment is the same as the multi-link processing in the embodiment in which the channel used for the multi-link is changed to a plurality of channels CH included in the same frequency band.

Figure 26:
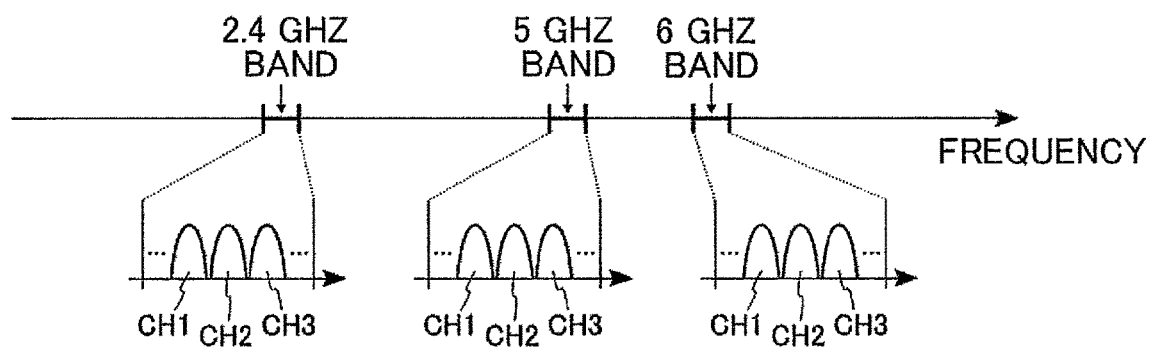
FIG. 26 is a conceptual diagram showing an example of frequency bands used for wireless communication in a wireless system according to a fifth modified example of the embodiment.

FIG. 26 shows an example of a frequency band used for wireless communication in the wireless system 1 according to the fifth modified example of the embodiment. As shown in FIG. 26, in wireless communication, for example, a 2.4 GHz band, a 5 GHz band, and a 6 GHz band are used. Each frequency band contains a plurality of channels. In this example, it is assumed that each of the 2.4 GHz band, 5 GHz band, and 6 GHz band contains at least three channels CH1, CH2, and CH3. Communication using each channel CH is realized by the associated STA function.

FIG. 27 shows an example of the link management information 121 in the wireless system 1 according to the fifth modified example of the embodiment. As shown in FIG. 27, the link management information 121 in the fifth modified example of the embodiment has a configuration in which information related to the channel ID for each frequency band is added to the link management information 121 in the embodiment. Also, in this example, the same multi-link as in the embodiment is established using the channel CH2 of "STA1" corresponding to the 6 GHz frequency band and the channel CH3 of "STA2" corresponding to the 6 GHz frequency band.

As described above, the same frequency band may be used for each STA function of the base station 10 and the terminal apparatus 20. Then, the multi-link between the base station 10 and the terminal apparatus 20 may be established by a plurality of STA functions using the same frequency band. Specifically, a plurality of STA functions may form a multi-link using, for example, different channel CHs in the 5 GHz band. Even in such a case, the wireless system 1 according to the fifth modified example of the embodiment can realize efficient communication and suppress power consumption as in the embodiment.

<5> OTHERS

In the third modified example of the embodiment, the case of allocating important traffic to the secondary link has been illustrated, but the present invention is not limited thereto. FIG. 28 shows an example of data allocation in the multi-link of the wireless system according to the third modified example of the embodiment. If important traffic is detected, various pieces of data may be allocated to the primary and secondary links, as shown in FIG. 28. The first example shows a case where the past traffic is allocated to the primary link and the increased traffic is allocated to the secondary link. The second example shows a case where a traffic with a large data size (for example, TCP traffic) is allocated to the primary link and a traffic with a small data size (for example, ACK) is allocated to the secondary link. As described above, in the multi-link, the data allocation between the primary link and the secondary link can be appropriately set based on the enable of the secondary link.

Figure 29:
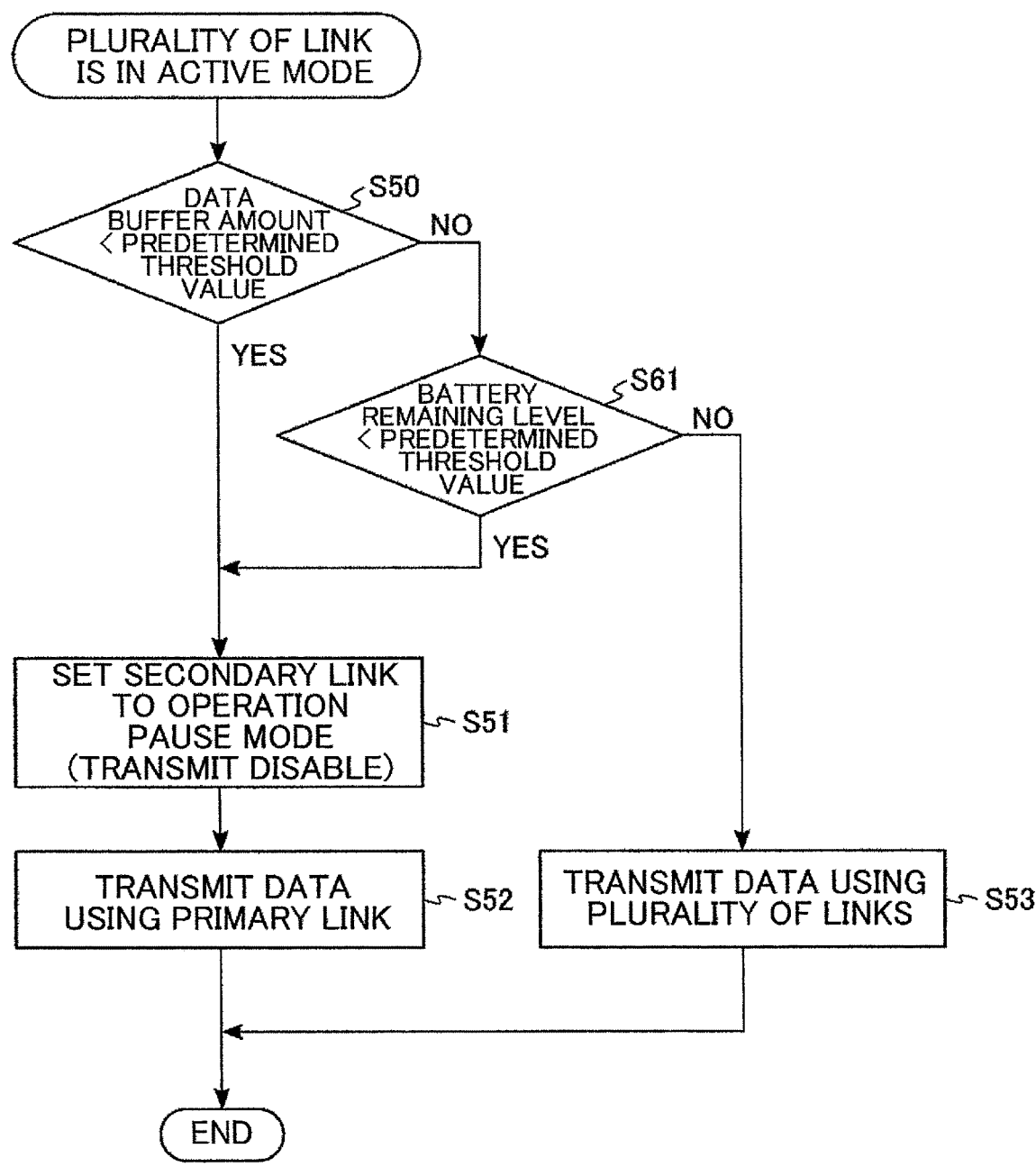
FIG. 29 is a flowchart showing an example of execution conditions of the link disable process in the wireless system according to a combination of the embodiment and the first modified example of the embodiment.

The embodiment and the modified examples can be combined with each other. FIG. 29 shows an example of execution conditions of the link disable process in the wireless system 1 according to the combination of the embodiment and the first modified example of the embodiment. As shown in FIG. 29, first, the determination of step S50 described in the embodiment is executed, and when the determination of step S50 is "NO", the determination of step S61 described in the first modified example of the embodiment may be executed. In this case, when the determination in step S61 is "YES", the process proceeds to, for example, step S51. As described above, in the link enable/disable process, two or more of the above-described embodiment and each modified example may be combined, and the effects of the combined embodiment and modified example can be obtained.

In the above-described embodiment, each STA function may notify the corresponding link management unit when the link cannot be maintained due to movement of the terminal apparatus 20 or the like. Also, the link management unit 220 of the terminal apparatus 20 may change the multi-link state with the link management unit 120 of the base station based on a notification from an STA function. Specifically, for example, the link management unit 220 of the terminal apparatus 20 and the link management unit 120 of the base station 10 may change the STA function used in the multi-link as appropriate. If the multi-link state is changed, the link management units 120 and 220 update the link management information 121 and 221 respectively. Also, the link management units 120 and 220 may update the association between the traffic and the STA function according to an increase or decrease in the number of links.

In the embodiment, in the multi-link processing, the case where the terminal apparatus 20 requests the base station 10 to establish the multi-link has been illustrated, but the present invention is not limited thereto. For example, the base station 10 may request the terminal apparatus 20 to establish a multi-link based on the fact that a plurality of links have been established between the base station 10 and the terminal apparatus 20. In the embodiment and each modified example, the "predetermined threshold value" used in the link enable process and the "predetermined threshold value" used in the link disable process may be the same or different.

In the embodiment, the case where each of the primary link and the secondary link is set to the active mode after the multi-link processing has been illustrated, but the present invention is not limited to this. During establishment of the multi-link, at least the primary link may be set to the active mode, and the secondary link may be set to either the active mode or the operation pause mode. The secondary link may be switched between the operation pause mode and the active mode based on a predetermined condition.

The configuration of the wireless system 1 according to the embodiment is merely an example, and other configurations may be used. For example, although a case was illustrated in which each of the base station 10 and the terminal apparatus 20 has three STA functions (wireless signal processing units), the present invention is not limited to this. The base station 10 may include at least two wireless signal processing units. Similarly, the terminal apparatus 20 may include at least two wireless signal processing units. Also, the number of channels that can be processed by each STA function can be set as appropriate according to the frequency band used. Each of the wireless communication modules 14 and 24 may support wireless communication in a plurality of frequency bands using a plurality of communication modules, or may support wireless communication in a plurality of frequency bands using a single communication module.

Also, the functional configurations of the base station 10 and the terminal apparatus 20 in the wireless system 1 according to the embodiment are merely examples. The functional configuration of the base station 10 and the terminal apparatus 20 may have other names and groupings as long as the operations described in each embodiment can be executed. For example, in the base station 10, the data processing unit 110 and the link management unit 120 may be collectively referred to as a data processing unit. Similarly, in the terminal apparatus 20, the data processing unit 210 and the link management unit 220 may be collectively referred to as a data processing unit.

Also, in the wireless system 1 according to the embodiment, the CPU included in each of the base station 10 and the terminal apparatus 20 may be another circuit. For example, an MPU (Micro Processing Unit) or the like may be used instead of the CPU. Also, each of the processes described in each embodiment may be realized using dedicated hardware. The wireless system 1 according to each embodiment may include both processes executed by software and processes executed by hardware, or may include only one of them.

In each embodiment, the flowchart used to describe the operations is merely an example. The order of the processing of the operations described in the embodiment may be interchanged within a possible range, and other processing may be added. Also, the format of the wireless frame described in the above embodiment is merely an example. The wireless system 1 may use another wireless frame format as long as it is possible to execute the operation described in each embodiment.

Note that the present invention is not limited to the above embodiments, and can be modified in various ways without departing from the scope thereof at the implementation stage. In addition, embodiments may be combined as appropriate, in which case combined effects can be achieved. Furthermore, the foregoing embodiments include various inventions, and various inventions can be extracted by selecting combinations of the multiple constituent elements disclosed herein. For example, even if several of the constituent elements described in the embodiments are removed, a configuration in which those constituent elements have been removed can be extracted as an invention as long as the problem can be solved and the effect can be achieved.

REFERENCE SIGNS LIST

1 Wireless system
10 Base station
20 Terminal apparatus
30 Server
11,21 CPU
12,22 ROM
13,23 RAM
14,24 Wireless communication module
15 Wired communication module
25 Display
26 Storage
110,210 Data processing unit
120,220 Link management unit
121,221 Link management information
122,222 Association processing unit
123,223 Authentication processing unit
124 Data categorization unit
125 Transmission queue
126 CSMA/CA execution unit
127 Data collision management unit
130,140,150,230,240,250 Wireless signal processing unit

The invention claimed is:

1. A base station comprising:
a first wireless signal processing unit configured to be able to transmit and receive a wireless signal using a first channel;
a second wireless signal processing unit configured to be able to transmit and receive a wireless signal using a second channel that is different from the first channel; and
a link management unit configured to establish a multi-link with a terminal apparatus using the first wireless signal processing unit and the second wireless signal processing unit, set the first wireless signal processing unit as a primary link used as a main link in the multi-link, and set the second wireless signal processing unit as a secondary link used as an auxiliary link in the multi-link, wherein when the secondary link is in an active mode and a first condition is satisfied in the multi-link, the link management unit sets the secondary link to an operation pause mode in which power consumption is lower than that of the active mode, and when the secondary link is in the operation pause mode and a second condition is satisfied in the multi-link, the link management unit sets the secondary link to the active mode.

2. The base station according to claim 1, wherein
the first condition corresponds to a fact that a buffer amount of data to be transmitted is less than a first threshold value,
the second condition corresponds to a fact that the buffer amount of data to be transmitted exceeds a second threshold value, and
the first threshold is equal to or less than the second threshold.

3. The base station according to claim 1, wherein
the first condition corresponds to a fact that a remaining battery level of the terminal apparatus is less than a third threshold value,
the second condition corresponds to a fact that the remaining battery level of the terminal apparatus exceeds a fourth threshold value, and
the third threshold is equal to or less than the fourth threshold.

4. The base station according to claim 1, wherein
the first condition corresponds to a fact that important traffic is not contained in data transmitted in the multi-link, and
the second condition corresponds to a fact that important traffic is contained in the data transmitted in the multi-link.

5. The base station according to claim 4, whereins
when important traffic is contained in the data transmitted in the multi-link, the link management unit transmits important traffic using the secondary link of the terminal apparatus, and sets a secondary link of another terminal apparatus that uses the same channel as the secondary link of the terminal apparatus to the operation pause mode.

6. A terminal apparatus comprising:
a first wireless signal processing unit configured to be able to transmit and receive a wireless signal using a first channel;
a second wireless signal processing unit configured to be able to transmit and receive a wireless signal using a second channel that is different from the first channel; and
a link management unit configured to establish a multi-link with a base station using the first wireless signal processing unit and the second wireless signal processing unit, set the first wireless signal processing unit as a primary link used as a main link in the multi-link, and set the second wireless signal processing unit as a secondary link used as an auxiliary link in the multi-link, wherein when the secondary link is in an active mode and a first condition is satisfied in the multi-link, the link management unit sets the secondary link to an operation pause mode in which power consumption is lower than that of the active mode, and when the secondary link is in the operation pause mode and a second condition is satisfied in the multi-link, the link management unit sets the secondary link to the active mode.

7. The terminal apparatus according to claim 6, wherein
the first condition corresponds to a fact that a buffer amount of data to be transmitted is less than a first threshold value,
the second condition corresponds to a fact that the buffer amount of data to be transmitted exceeds a second threshold value, and
the first threshold is equal to or less than the second threshold.

8. The terminal apparatus according to claim 6, wherein
the first condition corresponds to a fact that a remaining battery level of the terminal apparatus is less than a third threshold value,
the second condition corresponds to a fact that the remaining battery level of the terminal apparatus exceeds a fourth threshold value, and
the third threshold is equal to or less than the fourth threshold.

9. The terminal apparatus according to claim 6, wherein
the first condition corresponds to a fact that important traffic is not contained in data transmitted in the multi-link, and
the second condition corresponds to a fact that important traffic is contained in the data transmitted in the multi-link.

10. The terminal apparatus according to claim 9, wherein
upon receiving a wireless frame indicating that a secondary link of another terminal apparatus that uses the same channel as the secondary link of the terminal apparatus transmits important traffic, the link management unit sets the secondary link of the terminal apparatus to the operation pause mode.

* * * * *